United States Patent
Chen et al.

(10) Patent No.: US 7,742,620 B2
(45) Date of Patent: Jun. 22, 2010

(54) TARGET DETECTION IMPROVEMENTS USING TEMPORAL INTEGRATIONS AND SPATIAL FUSION

(75) Inventors: Hai-Wen Chen, Orlando, FL (US); Teresa L. Olson, Winter Garden, FL (US); Surachai Sutha, Kissimmee, FL (US)

(73) Assignee: Lockhead Martin Corporation, Bethesda, MD (US)

( * ) Notice: Subject to any disclaimer, the term of this patent is extended or adjusted under 35 U.S.C. 154(b) by 844 days.

(21) Appl. No.: 10/555,104

(22) PCT Filed: Mar. 18, 2004

(86) PCT No.: PCT/US2004/008345

§ 371 (c)(1),
(2), (4) Date: Oct. 26, 2006

(87) PCT Pub. No.: WO2005/022090

PCT Pub. Date: Mar. 10, 2005

(65) Prior Publication Data

US 2007/0076917 A1   Apr. 5, 2007

Related U.S. Application Data

(60) Provisional application No. 60/456,190, filed on Mar. 21, 2003.

(51) Int. Cl.
*G06K 9/00* (2006.01)

(52) U.S. Cl. ................. 382/103; 382/147; 382/149; 382/312

(58) Field of Classification Search ............... 382/103, 382/147, 149, 312; 342/52, 195, 53; 455/226.3; 702/116, 189, 190, 193; 324/164; 514/12; 375/240.12; 348/E5.042, 126, 87; 378/21, 378/22, 4, 137; 250/358.1
See application file for complete search history.

(56) References Cited

U.S. PATENT DOCUMENTS 4,926,452 A * 5/1990 Baker et al. .................. 378/22

(Continued)

OTHER PUBLICATIONS

Chen et al., "Integrated Spatio-Temporal Multiple Sensor Fusion System Design," SPIE Aerosense, Proceedings of Sensor and Data Fusion Conference, vol. 4731, pp. 204-215, Apr. 2002.

(Continued)

*Primary Examiner*—Anh Hong Do
(74) *Attorney, Agent, or Firm*—Birch, Stewart, Kolasch & Birch, LLP

(57) ABSTRACT

A method for identifying potential targets as far away as possible is disclosed. In a simple background scene such as a blue sky, a target may be recognized from a relatively long distance, but for some high clutter situations such as mountains and cities, the detection range is severely reduced. The background clutter may also be non-stationary further complicating the detection of a target. To solve these problems, target detection (recognition) of the present invention is based upon temporal fusion (integration) of sensor data using pre-detection or post-detection integration techniques, instead of using the prior art technique of fusing data from only a single time frame. Also disclosed are double-thresholding and reversed-thresholding techniques which further enhance target detection and avoid the shortcomings of the traditional constant false alarm rate (CFAR) thresholding technique. The present invention further discloses improved spatial fusion techniques for target detection (recognition) employing multiple sensors instead of employing the more conventional single sensor techniques. If spatial fusion is implemented with more than three sensors, then target detection can be enhanced by also using post-detection techniques. Moreover, since the pre-detection and the post-detection technique are complementary to each other, a combination of these two integration techniques will further improve target detection (recognition) performance.

20 Claims, 20 Drawing Sheets

U.S. PATENT DOCUMENTS

| | | | | |
|---|---|---|---|---|
| 5,081,656 | A | * | 1/1992 | Baker et al. .................... 378/21 |
| 5,097,492 | A | * | 3/1992 | Baker et al. .................... 378/22 |
| 5,291,535 | A | * | 3/1994 | Baker et al. .................... 378/22 |
| 5,561,696 | A | * | 10/1996 | Adams et al. ................. 378/58 |
| 5,621,811 | A | * | 4/1997 | Roder et al. ................ 382/147 |
| 6,018,562 | A | | 1/2000 | Willson |
| 6,897,446 | B2 | | 5/2005 | Chen et al. |
| 6,909,997 | B2 | | 6/2005 | Chen et al. |
| 6,944,566 | B2 | | 9/2005 | Chen et al. |
| 2003/0186663 | A1 | | 10/2003 | Chen et al. |

OTHER PUBLICATIONS

Chen et al., "Adaptive Spatio-Temporal Multiple Sensor Fusion," Journal of Optical Engineering, vol. 42, No. 5, May 2003.

Yaron Caspi, "Spatio-Temporal Alignment of Sequences," IEEE Transaction on Pattern Analysis and Machine Intelligence, vol. 24, No. 11, pp. 1409-1424, Nov. 1, 2002.

Alexander Strehl et al., "Detecting Moving Objects in Airborne Forward Looking Infra-Red Sequences," Computer Vision Beyond the Visible Spectrum: Methods and Applications, pp. 3-12, Jun. 21, 1999.

Hong Guo, et al. "Depth Detection of Targets in a Monocular Image," Digital Avionics Systems Conference, vol. B.6-6, vol. 2, pp. 8.A.2-1-8.A.2-7, Oct. 24, 1999.

Seong Kee Park et al., "Robust and direct estimation of 3-D motion and scene depth from stereo image sequences," Pattern Recognition, vol. 34, No. 9, pp. 1713-1728, Sep. 1, 2001.

* cited by examiner

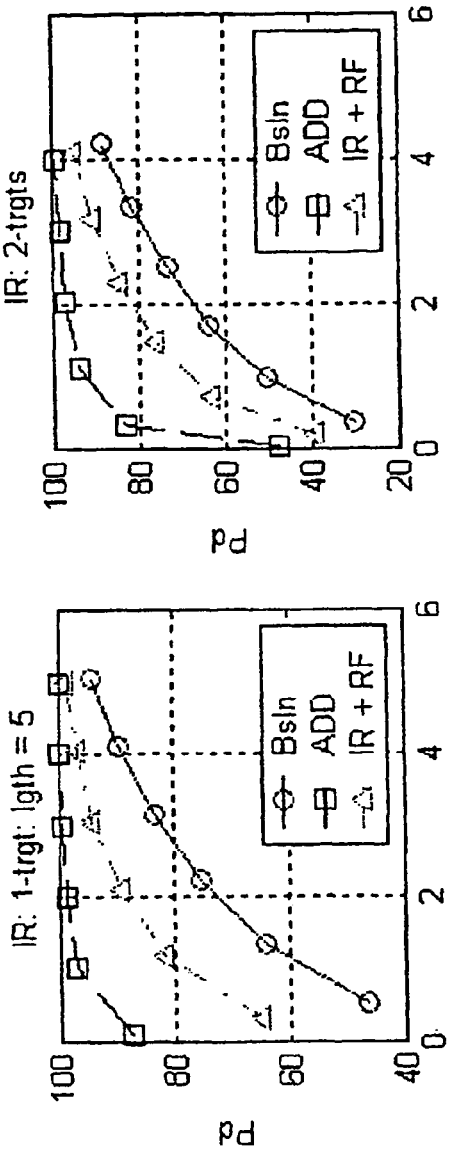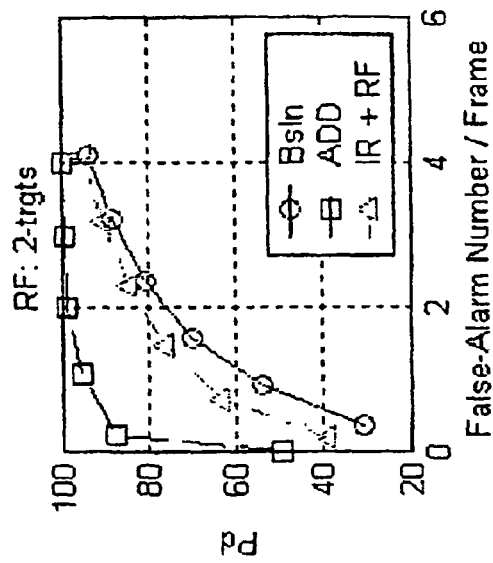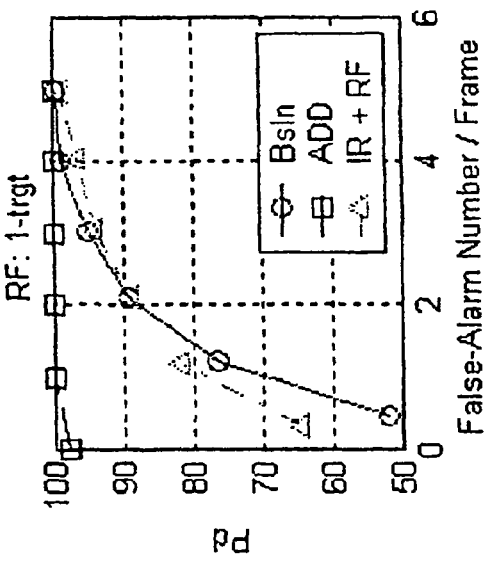

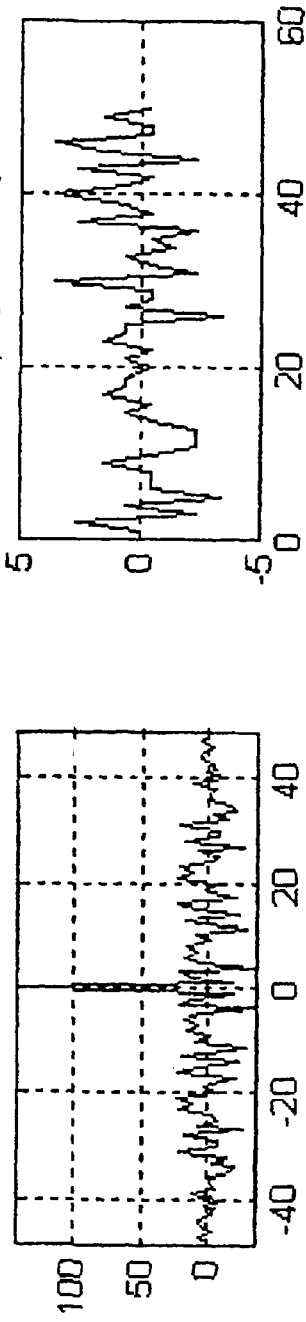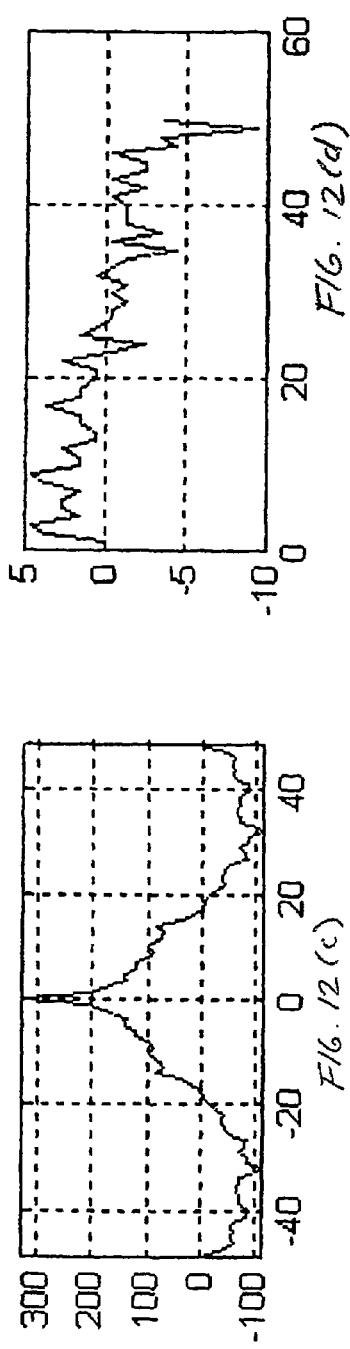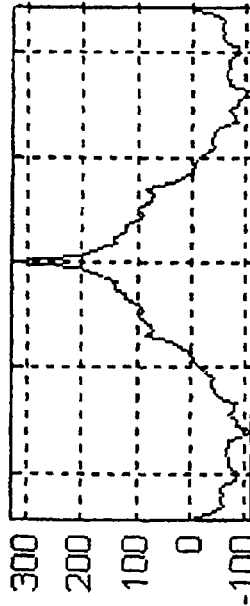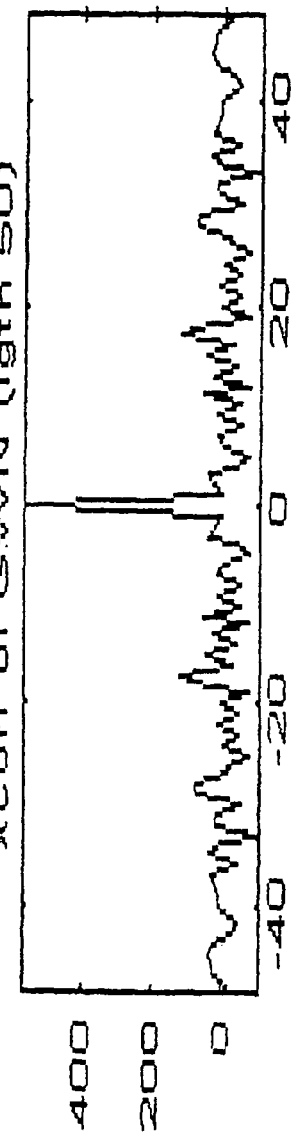

TARGET DETECTION IMPROVEMENTS USING TEMPORAL INTEGRATIONS AND SPATIAL FUSION

CROSS-REFERENCE

This application claims the benefit of U.S. provisional application Ser. No. 60/456,190, filed Mar. 21, 2003.

TECHNICAL FIELD

The present invention relates generally to data fusion, and more particularly to target identification techniques utilizing temporal integrations and spatial fusions of sensor data.

BACKGROUND OF THE INVENTION

Sensor systems incorporating a plurality of sensors (multi-sensor systems) are widely used for a variety of military applications including ocean surveillance, air-to-air and surface-to-air defense (e.g., self-guided munitions), battlefield intelligence, surveillance and target detection (classification), and strategic warning and defense. Also, multi-sensor systems are used for a plurality of civilian applications including condition-based maintenance, robotics, automotive safety, remote sensing, weather forecasting, medical diagnoses, and environmental monitoring (e.g., weather forecasting).

To obtain the full advantage of a multi-sensor system, an efficient data fusion method (or architecture) may be selected to optimally combine the received data from the multiple sensors to generate a decision output. For military applications (especially target recognition), a sensor-level fusion process is widely used wherein data received by each individual sensor is fully processed at each sensor before being output to a system data fusion processor that generates a decision output (e.g., "validated target" or "no desired target encountered") using at least one predetermined multi-sensor algorithm. The data (signal) processing performed at each sensor may include a plurality of processing techniques to obtain desired system outputs (target reporting data) such as feature extraction, and target classification, identification, and tracking. The processing techniques may include time-domain, frequency-domain, multi-image pixel image processing techniques, and/or other techniques to obtain the desired target reporting data.

It is advantageous to detect or identify image elements or targets as far away as possible. For example, in battle situations, candidate or potential targets should be detected early, increasing the likelihood of an early detection of a target or other object. For a simple background scene such as a blue sky, a target may be recognized from a relatively long range distance. However, for some high clutter situations such as mountains and cities, the detection range is severely reduced. Moreover, such clutter situations are often complicated to process. For example, the background may be mixed with different clutter types and groups. Also the background clutter may be non-stationary. In these types of situations, the traditional constant false alarm ratio (CFAR) detection technique often fails.

Spatio-temporal fusion for target classification has been discussed in the art. The fusion is conducted in the likelihood function reading domain. In general, the likelihood functions (pdfs) are obtained from training data based on single sensor and single frame measurements. Therefore, fusion is conducted using the likelihood readings of the features extracted from measurements of single sensor and frame, only one set of likelihood functions needs to be stored for a single sensor and frame, no matter how many sensors and frames are used for fusion. On the other hand, if the detection process uses thresholding technique instead of likelihood functions, the features values can be directly fused from different sensors and time frames in the feature domain for target detection.

Spatial fusion is defined as the fusion between different sensors, and temporal fusion is defined as the temporal integration across different time frames within a single sensor. Accordingly, it is desirable to develop and compare different spatial fusion and temporal integration (fusion) strategies, including pre-detection integration (such as additive, multiplicative, MAX, and MIN fusions), as well as the traditional post-detection integration (the persistency test). The pre-detection integration is preferably conducted by fusing the feature values from different time frames before the thresholding process (the detection process), while the post-detection integration is preferably conducted after the thresholding process.

SUMMARY OF THE INVENTION

The present invention overcomes the problems described above by using both spatial fusion and temporal integration to enhance target detection (recognition). More specifically, pre-detection temporal integration and spatial fusion techniques are disclosed for enhancing target detection and recognition. These techniques involve different spatio-temporal fusion strategies such as the additive, multiplicative, maximum, and minimum fusions. In spatial fusion, extracted features from different sensors are fused. In temporal fusion, extracted features across a multiple time frame window are fused and integrated. In addition, a double-thresholding technique is disclosed when the background scene is mixed with different clutter sub-groups. Some of these features may have means larger than the target mean, while some of them may have means smaller than the target mean. This technique selects a lower bound threshold (below the target mean) and a higher bound threshold (above the target mean). This technique in combination with the spatio-temporal fusion techniques will threshold out most of the different clutter groups. Further, a reverse-thresholding technique is disclosed for use when the background scene contains non-stationary clutters with increasing or decreasing means. The detection assignment criteria may be reversed depending on if the clutter mean is larger or smaller than the target mean.

DESCRIPTION OF THE DRAWINGS

FIGS. 7a-7d are graphs depicting additive spatio-temporal fusion;

FIGS. 12a-12e are graphs depicting auto-correlations of real and computer generated noise;

DETAILED DESCRIPTION OF THE INVENTION

Figure 1:
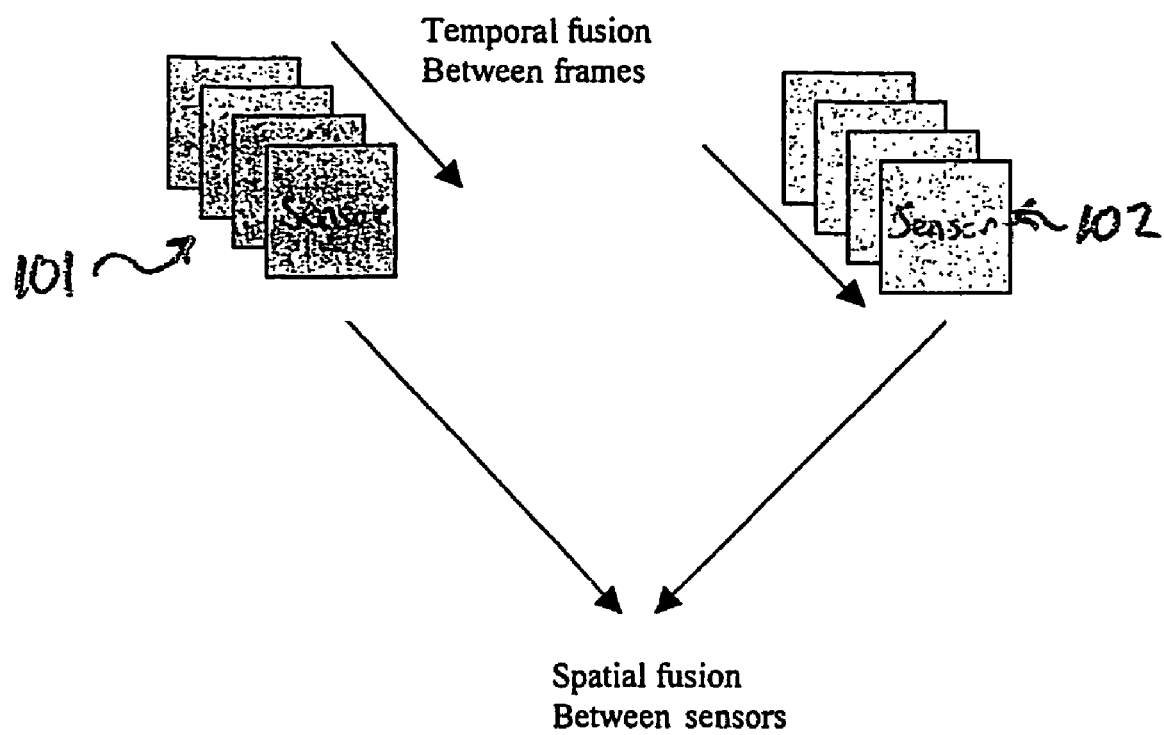
FIG. 1 is a block diagram illustrating the relationship between temporal fusion and spatial fusion.

There are a number of acronyms associated with the description of the present invention, and in order to facilitate an understanding of the description, a glossary of acronyms is provided below:

ATR—automatic target recognition
CFAR—constant-false-alarm-ratio
FPA—focal plane array
FPN—fixed pattern noise
IR—infrared
NUC—non-uniformity correction
Pd—probability of detection
Pdf—probability density function
Pfa—probability of false-alarm
ROC—receiver operating characteristics
RV—random variable
STD—standard deviation
SCNR—signal-to-clutter-noise-ratio Although techniques of the present invention are aimed for improving target detection, these techniques can be used for other applications involving thresholding techniques. In target recognition, ATR (automatic target recognition) is a research area with high attention. One popular ATR approach uses the matched filtering/correlation techniques, and the resulting features after the correlation (e.g., the peak-to-side-lobe-ratio) will subject a threshold-screening to pick the recognized targets. Therefore, both the pre- and post-detection temporal integration methods can be used to enhance target recognition when multiple temporal frames are involved.

The assignee of the present invention has a number of currently pending patent applications related to the subject matter of the present invention. These pending applications include patent application Ser. No. 10/395,215, filed Mar. 25, 2003, entitled "Method and System for Multi-Sensor Data Fusion Using a Modified Dempster-Shafer Theory", by Chen et al.; patent application Ser. No. 10/395,264, filed Mar. 25, 2003, entitled "Method and System for Target Detection Using an Infra-Red Sensor", by Chen et al.; patent application Ser. No. 10/395,265, filed Mar. 25, 2003, entitled "Method and System for Multi-Sensor Data Fusion", by Chen et al.; patent application Ser. No. 10/395,269 filed Mar. 25, 2003, entitled "Method and System for Data Fusion Using Spatial and Temporal Diversity Between Sensors", by Chen et al.; all of which are incorporated herein by reference.

The present invention involves sensor clutter noise looking at real scenes, such as trees, grass, roads, and buildings, etc. Typically, the sensor clutter noise at most of the sensor pixels in a scene, usually more than 95% of the pixels, is near stationary. The sensor clutter noise is un-correlated between pixels, as well as almost being un-correlated across time frames. The noise at a few pixels has shown non-stationary properties with an increasing or decreasing mean across time. Pixels with these non-stationary properties could include pixels that represent the grass near the edge of a road.

If clutters with broader pdf (probability density function) than the target are encountered, it is desirable to determine whether the broad clutter pdf is caused by non-stationary noise with a time-variant mean or is caused by a mix of different clutter types with different stationary means. Then different detection techniques, such as the double-thresholding or reverse-thresholding schemes, may be selected accordingly.

Temporal correlation and non-stationary properties of sensor noise have been investigated using sequences of imagery collected by an IR (256×256) sensor looking at different scenes (trees, grass, roads, buildings, etc.). The natural noise extracted from the IR sensor, as well as noise generated by a computer with Gaussian and Rayleigh distributions have been used to test and compare different temporal integration strategies. The simulation results show that both the pre- and post-detection temporal integrations can considerably enhance target detection by integrating only 3~5 time frames (tested by real sensor noise as well as computer generated noise). Moreover, the detection results can be further enhanced by combining both the pre- and post-detection temporal integrations.

For a physical sensor, the sensing errors are mainly caused by the measurement noise $n_m$ that is generally described as a random variable (RV). For example, for an IR (infrared) sensor, the measurement noise (temporal noise) may originate from a number of sources including the scene background, atmosphere transmission, path radiance, optics, filters, sensor housing and shield, detector dark current, pixel phasing, quantization, amplifier and read-out electronics, etc.

For target detection at the feature level, different features are extracted from the original physical measurements. In the IR sensor, for detecting a resolved target occupying multiple pixels of for an unsolved target occupying only a single pixel, a spatial matched filtering process in general is conducted before the detection (thresholding) process. The filter can be a Sobel edge extractor, a difference of Gaussian filter, a specific tuned basis function, or an optical point spread function. The output of the filter is considered the feature values for detection.

The extracted features affected by the measurement noise are also RVs. The pdf (probability density function) of a feature RV may or may not have the same distribution as the original measurement noise. If a measurement noise has a Gaussian distribution and the extracted feature is a linear transform (e.g., the mean or average of multiple data points is a linear feature) of the physical measurement, the distribution of the feature RV will still be Gaussian. On the other hand, if the relationship between the extracted feature and the original measurement is non-linear, the feature distribution, in general, will be different from the original one. For example, for a radar sensor with a Gaussian distributed measurement noise, if we use the amplitude of the radar return real and imaginary signals as the extracted feature, the distribution of the feature RV will be Rayleigh. To increase the Pd (probability of detection), we must reduce the influence of the feature RVs. The influence of RVs can be decreased by reducing the variances ($\sigma^2$) of the RVs and/or by increasing the distance (d) between the means of the two feature RVs related to the target and the clutter). The reduced feature variances and/or the increased feature distances will increase the signal-to-clutter-noise-ratio (SCNR) and thus lead to a better ROC (receiver operating characteristics) performance, i.e., a higher Pd for the same Pfa (probability of false alarms).

Two approaches for reducing the variance of RVs are 1) temporal integration between time frames by averaging the RVs in different frames (the pre-detection integration), and 2) a binomial persistency test using a window of time frames (the post-detection integration). Wold in 1938 proposed and proved a theorem. See, Haykin, Simon, "Adaptive Filter Theory, Prentice-Hall Inc. 1986. This theorem gives us some insight into how temporal integration can be useful:

Wold's Fundamental Theorem:

Any stationary discrete-time stochastic process $\{x(n)\}$ may be expressed in the form $$x(n)=u(n)+s(n),$$

where $u(n)$ and $s(n)$ are uncorrelated process, $u(n)$ is a RV, and $s(n)$ is a deterministic process.

Therefore, if $u(n)$ is less temporally correlated, temporal integration will be more useful to reduce the variance of $u(n)$. In this case, temporal integration across multiple time frames (temporal fusion) can enhance detection and classification results. The integrated spatio-temporal fusion, which is sketched in FIG. 1, includes a first set of sensors 101 in which there is temporal fusion between frames. There can also be spatial fusion between the first set of sensors 101 and a second set of sensors 102.

Besides the temporal uncorrelated noise condition that is important for effective temporal integration (fusion), there is another condition need to be addressed. In many realistic situations, the target may be moving and the sensor platform may be moving relative to the background clutters. Therefore, another critical condition for effective temporal fusion is the accurate tracking and associating the targets and clutter objects (i.e., the detected objects) at different time frames using navigation initial tracker and/or image-based tracker or any effective image/object registration/association/correlation techniques.

We will now describe four fusion (RV combination) strategies: 1) additive, 2) multiplicative, 3) minimum ("MIN"), and 4) maximum ("MAX") fusion. A more detailed description of the additive fusion and its advantage when adaptively weighting different sensors is provided in Chen et al., "Integrated Spatio-Temporal Multiple Sensor Fusion System Design," SPIE Aerosense, Proceedings of Sensor and Data Fusion Conference, vol. 4731, pp. 204-215, April 2002; Chen et al., "Adaptive Spatio-Temporal Multiple Sensor Fusion", Journal of Optical Engineering, Vol. 42, No. 5, May 2003.

Additive Fusion

The additive fusion rule for two sensors (or two time frames) is $$p(t)=p(t1)+p(t2), \text{ and } p(c)=p(c1)+p(c2), \quad (1)$$

where $p(t)$ is the fused target feature values, $p(t1)$ and $p(t2)$ are the target feature values at sensor1 and sensor2 (or time frame1 and frame2), respectively; $p(c)$ is the fused clutter feature values, $p(c1)$ and $p(c2)$ are the clutter feature values at sensor1 and sensor2 (or time frame1 and frame2), respectively. In a frame, there are generally many more clutter feature values at different pixel locations.

The additive fusion can be easily extended to include more than two sensors (spatial fusion) or more than two time frames (temporal integration):

$$p(t)=p(t1)+p(t2)+\ldots+p(tn), \text{ and } p(c)=p(c1)+p(c2)+\ldots+p(cn). \quad (2)$$

For two independent RVs: X and Y, the combined pdf of the summation of these two RVs (Z=X+Y) is calculated as the convolution of the two individual pdfs:

$$f_Z(z) = \int_0^\infty f_X(x)f_Y(z-x)dx. \quad (3)$$

In our additive fusion case (with two sensors or two frames), $p(t)=z$, $p(t1)=x$, and $p(t2)=y$ [or $p(c)=z, p(c1)=x$, and $p(c2)=y$]. From Eq. (3), we have $$f_{p(t)}(p(t)) = \int_0^\infty f_{p(t1)}(p(t1))f_{p(t2)}(p(t)-p(t1))dp(t1), \quad (4)$$

and $$f_{p(c)}(p(c)) = \int_0^\infty f_{p(c1)}(p(c1))f_{p(c2)}(p(c)-p(c1))dp(c1). \quad (5)$$

Eqs. (4) and (5) can be used to predict the detection performance of the additive fusion, since the ROC curves after the additive fusion can be estimated from the combined pdfs in Eqs. (4) and (5).

Multiplication Fusion

The multiplicative fusion rule of two sensors (or two time frames) is $$p(t)=p(t1)*p(t2), \text{ and } p(c)=p(c1)*p(c2). \quad (6)$$

For two independent RVs: X and Y, the combined pdf of the multiplication of these two RVs (Z=X*Y) is calculated as the nonlinear convolution (with divisions of a RV) of the two individual pdfs:

$$f_Z(z) = \int_0^\infty \frac{1}{|x|} f_X(x)f_Y\left(\frac{z}{x}\right)dx. \quad (7)$$

In our two-sensor multiplication fusion case, from Eq. (7), we have $$f_{p(t)}(p(t)) = \int_0^\infty \frac{1}{|p(t1)|} f_{p(t1)}(p(t1))f_{p(t2)}\left(\frac{p(t)}{p(t1)}\right)dp(t1), \quad (8)$$

and $$f_{p(c)}(p(c)) = \int_0^\infty \frac{1}{|p(c1)|} f_{p(c1)}(p(c1))f_{p(c2)}\left(\frac{p(c)}{p(c1)}\right)dp(c1). \quad (9)$$

The Relationship Between Additive and Multiplication Fusions

If we take the logarithm on both sides of the multiplication fusion equations [Eq. (6)], we have $$ln[p(t)]=ln[p(t1)]+ln[p(t2)], \text{ and } ln[p(c)]=ln[p(c1)]+ln[p(c2)]. \quad (10)$$

The multiplication term becomes two additive terms of logarithm functions in each of the equation. If we have two RVs with log-normal pdfs, the equations above indicate that the multiplicative fusion of two RVs with log-normal distributions is equivalent to the additive fusion of two RVs with normal distributions.

MIN and MAX Fusions

The conjunction (AND) and disjunction (OR) are two frequently used combination rules in Fuzzy Logic. For two independent RVs: X and Y, the combined pdf of the conjunction of these two RVs [Z=min(X,Y)] is given as $$f_Z(z) = f_X(z)[1 - F_Y(z)] + f_Y(z)[1 - F_X(z)], \quad (11)$$

where F(z) is the cumulative distribution function.

Similarly, for two independent RVs: X and Y, the combined pdf of the disjunction of these two RVs [Z=max(X,Y)] is given as $$f_Z(z) = f_X(z)F_Y(Z) + f_Y(z)F_X(Z). \quad (12)$$

For our two-object problem, the MIN (conjunction) fusion is $$p(t) = \min[p(t1), p(t2)], \text{ and } p(c) = \min[p(c1), p(c2)]. \quad (13)$$

The MAX (disjunction) fusion is $$p(t) = \max[p(t1), p(t2)], \text{ and } p(c) = \max[p(c1), p(c2)]. \quad (14)$$

The terms of pre-detections and post-detection integrations were originally used in radar sensor detection. They can be equally applied for IR sensor detection. For both methods, a temporal moving integration widow (typically containing several frames, e.g., N=5 or 7) is first selected. In the pre-detection method, one of the different fusion strategies discussed above is applied for the frames within the window size. The fused features values are then used for detection (applying thresholding). In the post-detection (also called persistency test) method, detection (thresholding) is first performed on each image frame within the moving window (with N frames). Then k (k≦N) detections are evaluated out of the N frames that occurred for a detected object. For example, for a criteria of 5 out of 7, if an object was detected from 5 or more frames in a moving window with 7 frames, the detected object is considered as a target. Otherwise, it is considered as noise or clutter detection.

Figure 2A:
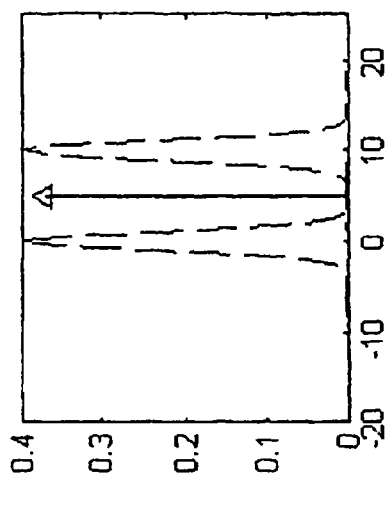
FIGS. 2a-2d are graphs depicting the performance of pre-detection and post-detection integration.
Figure 2B:
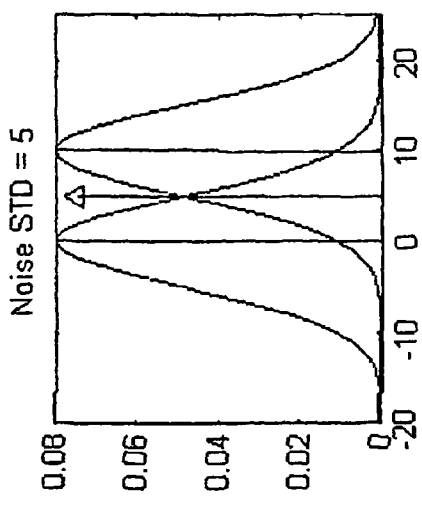
Figure 2C:
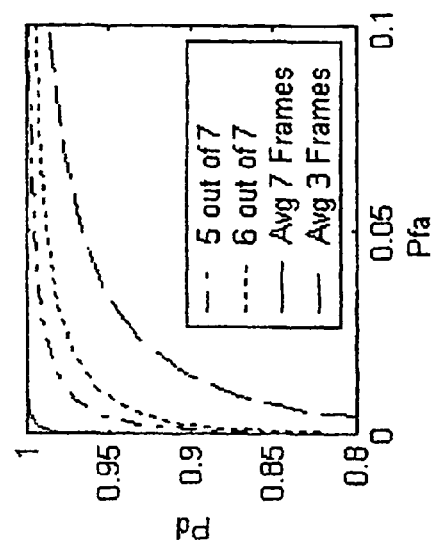

FIG. 2(a) shows the pdfs (probability density functions) for a noise and a target in a single frame with STD (standard deviation)=5. FIG. 2(b) shows the pdfs after averaging 25 frames (the pre-detection integration, which is equivalent to the additive fusion). The STD of the pdf's in FIG. 2(b) is reduced by a factor of 5. The accumulated probability curves (the error functions) of the pdfs in FIGS. 2(a) and (b) are plotted in FIG. 2(c), where the solid curves denote the single frame and the dashed curves represent the average of twenty-five frames. For the pre-detection integration, the ROC curves are obtained by directly plotting the accumulated probability curves of the target and noise shown in FIG. 2(c) as the y and x axes, respectively, in FIG. 2(d). For a k-out-of-N post-detection integration, the accumulated probability curves need to be transferred to post-detection accumulated probability curves using the binomial equation:

$$P(k:N) = \sum_{j=k}^{N} \binom{N}{k} p^j (1-p)^{N-j} \quad (15)$$

where p is a specific probability value from the accumulated probability curves in FIG. 2 (c). Therefore, all the values of a curve in FIG. 2(c) can be transferred to a new curve use of equation (15). It can be seen that equation (15) contains all the probabilities of k out of N, (k+1) out of N, . . . until N our of N. A ROC curve for the post-detection integration is obtained by directly plotting the transferred accumulated probability curves of the target and the noise as the y and x axes, respectively, in FIG. 2(d).

Figure 2D:
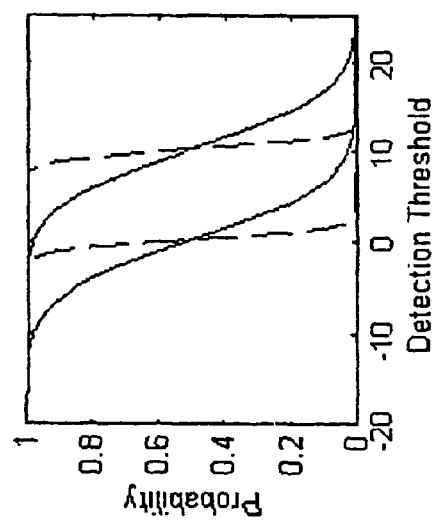

Several ROC curves are plotted in FIG. 2(d). The top and bottom (solid and dashed) curves are 7-frame average and 3-frame average pre-detection integration, respectively. The middle two (dash-dotted and dotted) curves are 5-out-of-7, and 6-out-of-7 post-detection integration or persistency test results, respectively. It can be seen from FIG. 2(d) that for a same frame window (e.g., 7 frame), the pre-detection integration performs better than the post-detection integration.

Figure 17:
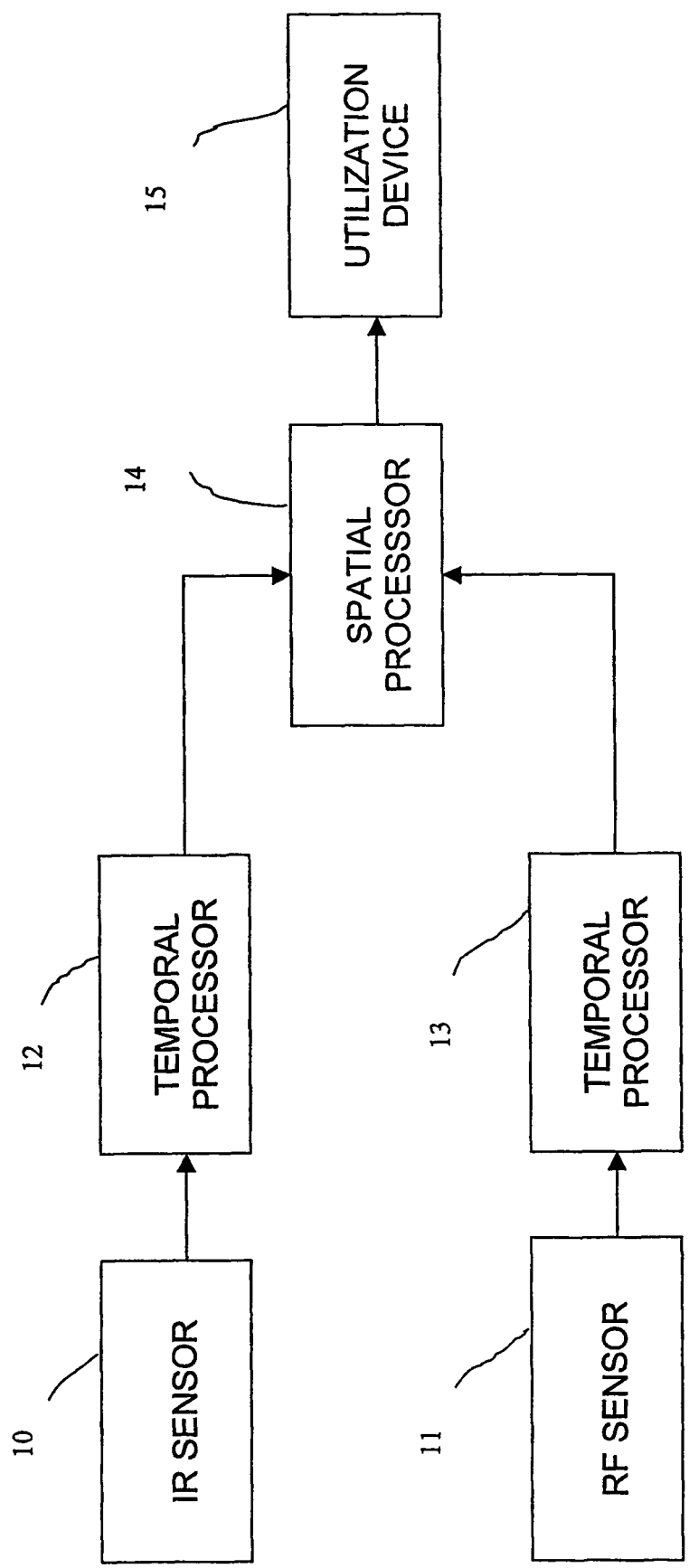
FIG. 17 is a block diagram of a hardware system that performs spatio temporal fusion.

Referring now to FIG. 17, a block diagram illustrates a hardware system that can be used to implement spatio temporal fusion of data from a plurality of sensors 10, 11. The sensors in FIG. 17 include an IR sensor 10 and a RF sensor 11. The sensors do not have be of different types, and such a system could be implemented using multiple sensors of the same type. The outputs of the IR sensor 10 and RF sensor 11 are temporally fused using temporal processors 12, 13, respectively, as described in more detail below. The temporally fused outputs of temporal processors 12, 13 are then preferably applied to a spatial processor 14 for spatial fusing and detection. The output of the spatial processor 14 is applied to a utilization device 15. The utilization device 15 could be a simple visual display or a more complicated device, such as a tracking system or an automatic target recognition system.

Figure 3:
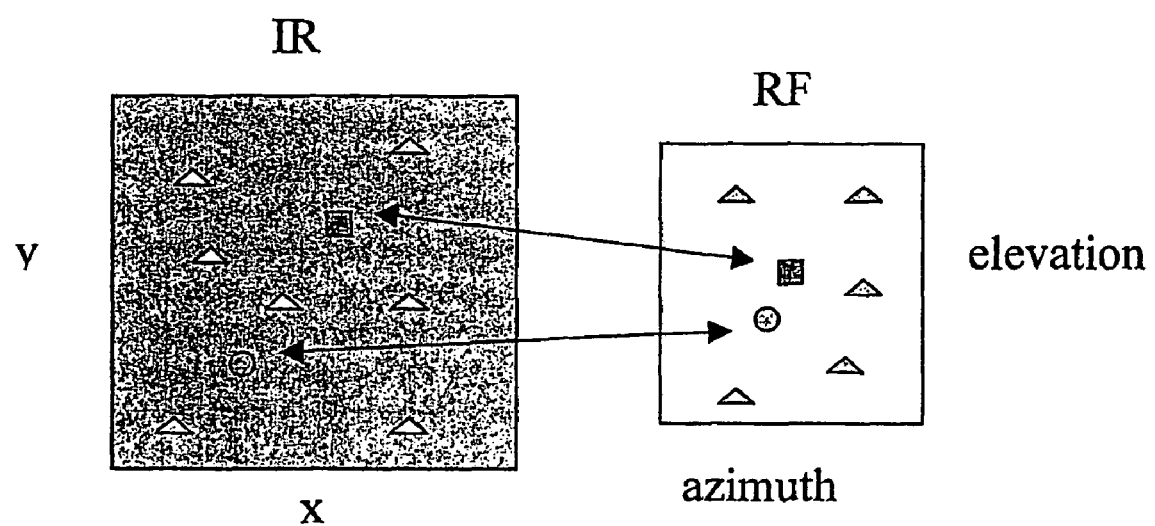
FIG. 3 is a block diagram illustrating target detection involving two-targets.

As shown in FIG. 3, we simulated both IR and RF sensors for target detection enhancements using spatio-temporal fusion. In FIG. 3, the squares represent target 1, the circles represent target 2 and triangles represent clutter noise. Spatial Fusion (integration) is conducted between the IR and the RF frames (pre-detection integration only), while Temporal Fusion is conducted across several time frames of each sensor (both pre- and post-detection integration). Two target situations were simulated: 1) single-target in the scene, and 2) two-targets in the scene. In general, the single-target case has less adjustable parameters and thus would be easier to compare performances from different fusion strategies than the multiple-target case. However, the multiple-target case occurs in many realistic situations. A two-target case is shown in FIG. 3. In this simulation, we used static targets and clutter, and presume perfect object tracking and/or registration across multiple time frames.

Figure 4:
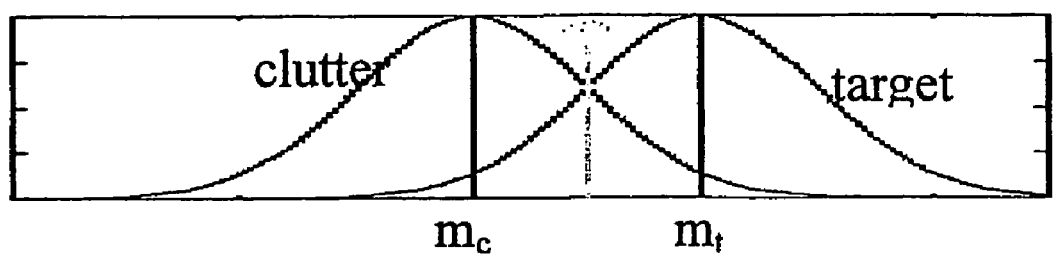
FIG. 4 is a graph depicting the Gaussian probability of detection of a target and clutter noise.

Fifty random data samples (related to fifty time frames) were generated as performance data set for each object (target or clutter noise) to evaluate the detection performance. The detection was conducted using the traditional CFAR (constant-false-alarm-ratio) strategy. For a specific CFAR threshold, each detected target at one of the 50 frames counts on 2% of Pd (probability of detection) for the single-target case, and 1% of Pd for the two-target case. The noise in IR is simulated as a normal distribution with a standard deviation of 10, and the noise in RF is simulated as a Rayleigh distribution with a standard deviation of 6.5. FIG. 4 shows the pdfs (probability density functions) of a target and a clutter noise both with normal distributions. In the single-target case the separation of the means between the target and the clutter noise group is set as $S = m_t - m_c = 19$ and $S=10$ for rf. In the two target case, $S_1 = 19$ and $S_1 = 25$ or IR; $S_1 = 10$ and $S_1 = 17$ for rf.

Figure 5B:
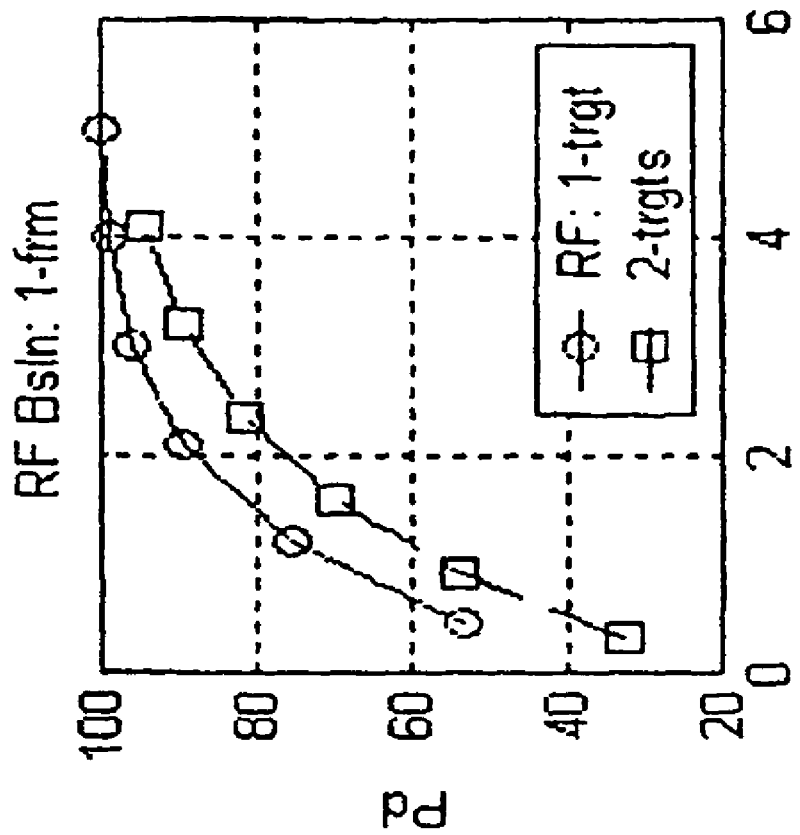
FIGS. 5a-5b are graphs depicting the performance of single frame detection for receiver operating characteristics.
Figure 5A:
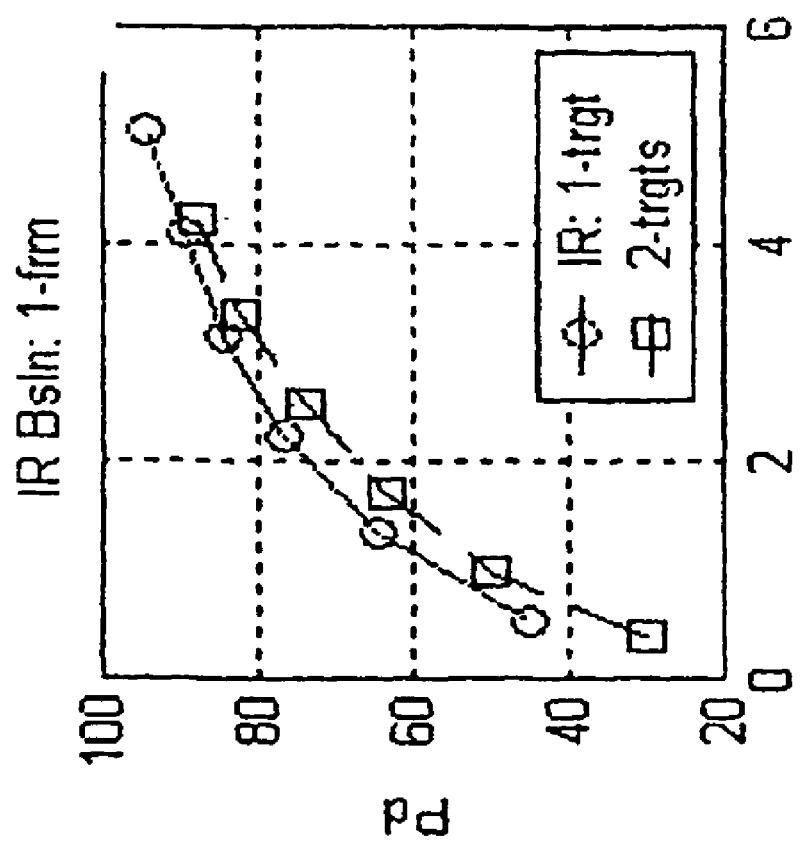

The detection ROC performances without any temporal integration (single frame) are shown in FIG. 5 as a baseline performance to compare different temporal fusion strategies. FIG. 5(a) shows the baseline result from an IR sensor, while FIG. 5(b) shows that from a RF sensor. The y-axis is the Pd (probability of detection), and the x-axis is the false-alarm number per frame. The curve with circle symbols is the result from the single-target case, and the curve with square symbols is the result from the two-target case. It is seen that for a false alarm rate of two false alarms per frame the Pd is about 75% for IR and 87% for RF, and that the single-target case performs a little better that the two-target case.

Additive Spatial Fusion vs. Additive Temporal Fusion

For the four different fusion strategies discussed above, our simulation results for target detection show that the multiplication fusion performs the same as the additive fusion, and the MIN fusion performs better than the MAX fusion. Disclosed herein are the results for the Additive and MIN fusion.

Figure 6B:
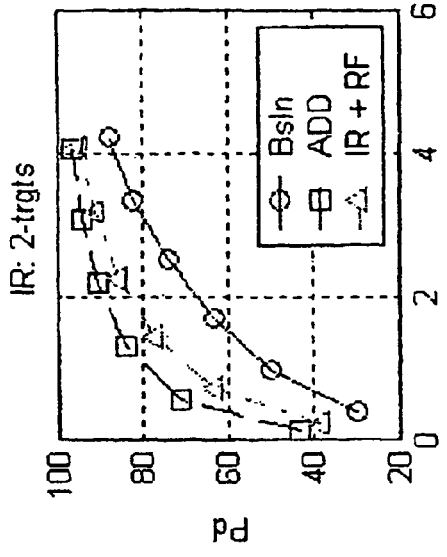
FIGS. 6a-6d are graphs depicting additive spatio-temporal fusion.
Figure 6A:
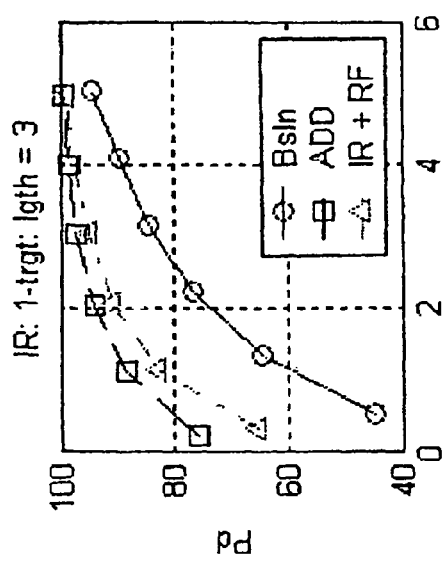
Figure 6D:
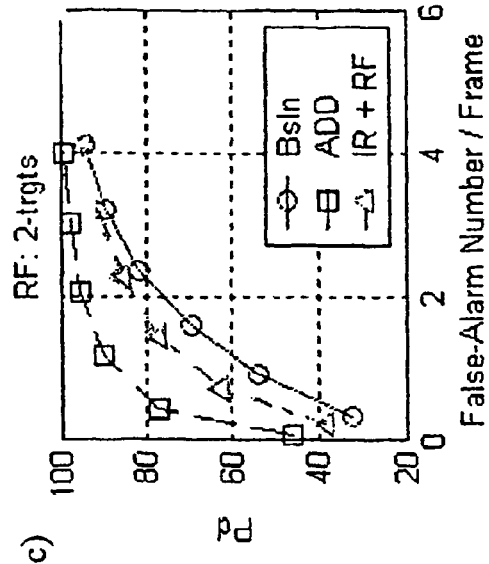
Figure 6C:
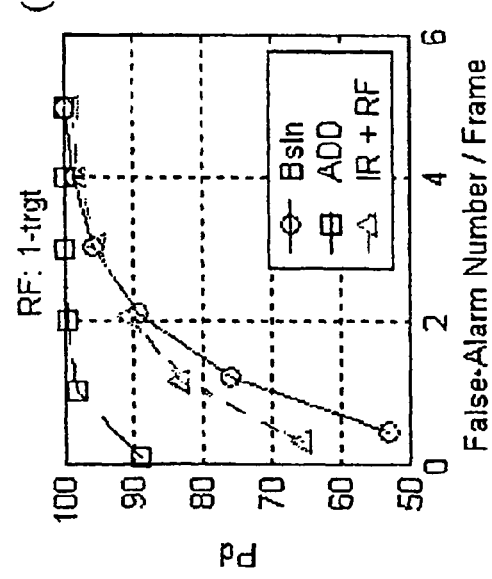
Figure 8A:
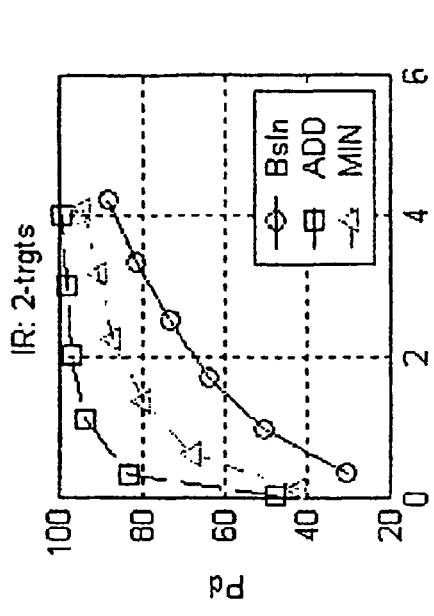
FIGS. 8a-8d are graphs depicting additive and MIN fusions.
Figure 8C:
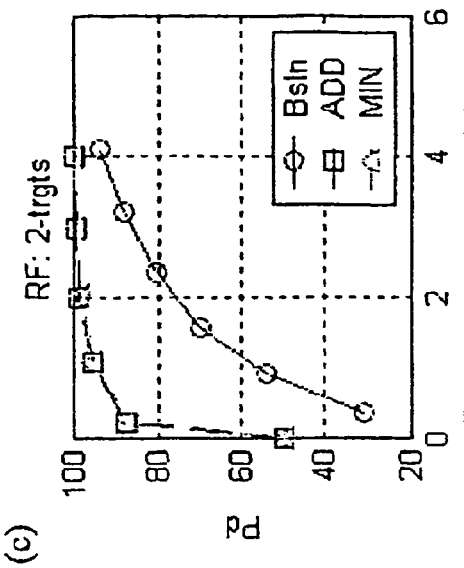
Figure 8B:
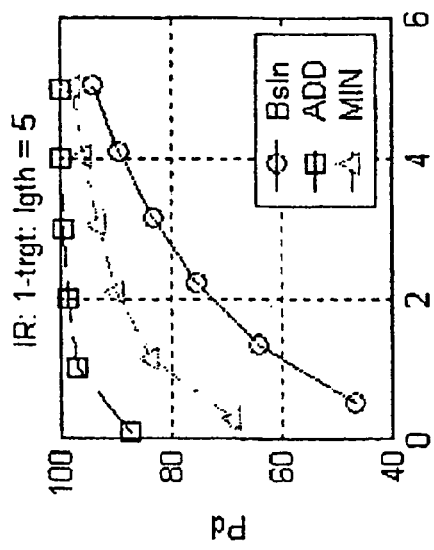
Figure 8D:
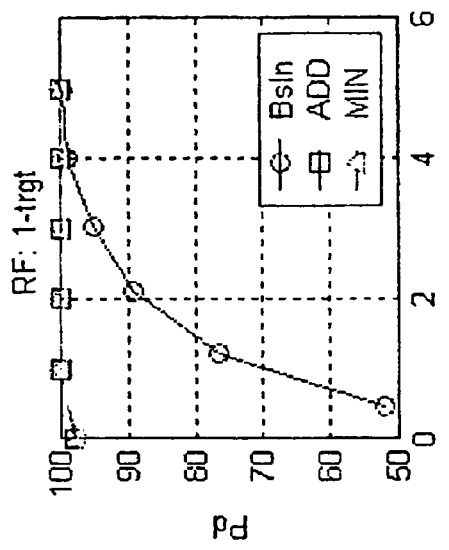

The detection ROC performance curves for the single-target case of IR sensor are shown in FIG. 6(a), while the detection ROC performance curves for the two-target case of IR sensor are shown in FIG. 6(b). The curve with the circle symbols shows the baseline performance (single frame). The curve with the triangle symbols shows the result of spatial additive fusion between the IR and the RF sensor, while the curve with the square symbols shows the result of additive temporal fusion by integrating a time window of three frames. Similar results for the RF sensor are shown in FIGS. 6(c) and 6(d). It is found the spatial fusion improves detection and performs better than the single sensor alone. The IR (the worse sensor) improved more than the RF (the better sensor) did. Furthermore, the temporal fusion using three time frames performs better that the spatial fusion using only two sensors. In general, if the noise in different frames are independent to each other, a temporal fusion with N=2,3, ... frames should perform similar to a spatial fusion with N sensors. We will discuss the noise correlation properties between frames below. The results of additive temporal fusion using five time frames are shown in FIG. 7. In FIG. 7a 7d, there is a window that is equal to five frames. FIG. 7a depicts the curves for an IR sensor and one target. FIG. 7b depicts the curves for an IR sensor and two targets. FIG. 7c depicts the curves for RF sensor and one target. FIG. 7d depicts the curves for an RF sensor and two targets. By increasing the time window of integration, the target detection is further enhanced.

Additive Temporal Fusion vs. MIN Temporal Fusion

The results comparing the additive fusion with the MIN fusion for an integration window of five frames are shown in FIG. 8. Both additive and MIN fusions with multiple frames enhance target detection. For the IR sensor (with normal noise distribution), the additive fusion always outperforms the MIN fusion in both the single-target and two-target cases as shown in FIGS. 8(a) and (b), while for the RF sensor (with Rayleigh noise distribution), the MIN fusion can further enhance target detection, and performs equally well as the additive fusion in both the single-target and two-target cases as shown in FIGS. 8(c) and (d).

Post-Detection Integration (Persistency Test)

Figures 9A, 9B:
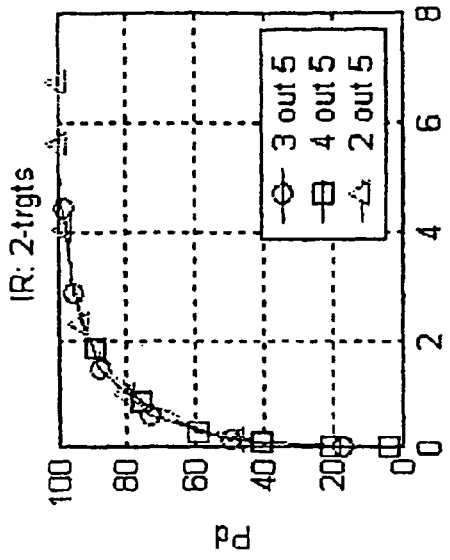
FIGS. 9a-9d are graphs depicting a persistency test.
Figure 9C:
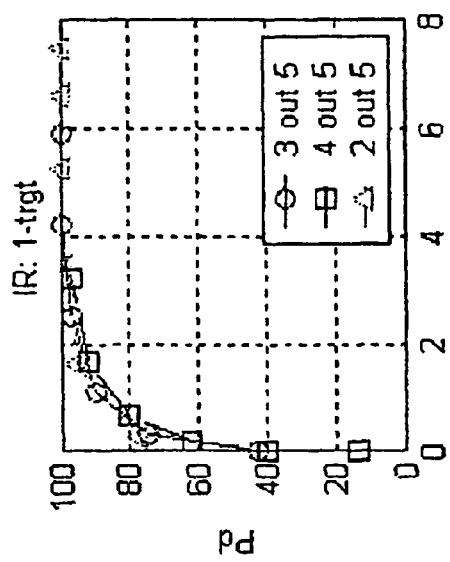
Figure 9D:
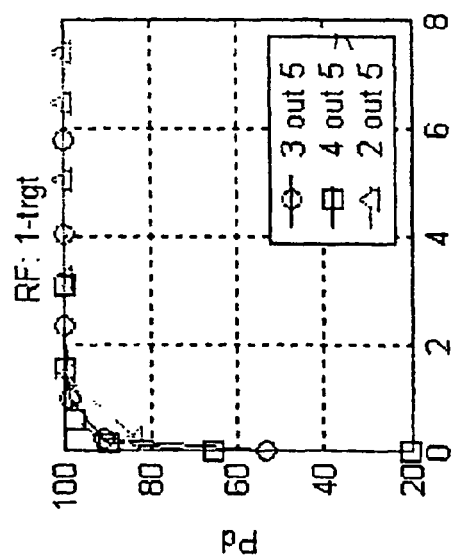
Figure 10A:
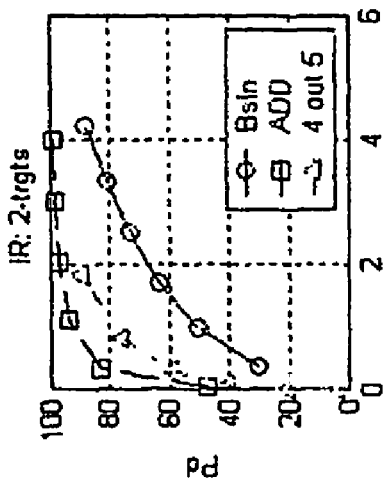
FIGS. 10a-10d are graphs depicting an additive fusion and persistency test.
Figure 10C:
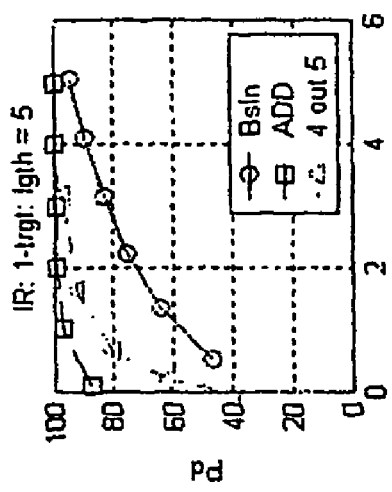
Figure 10B:
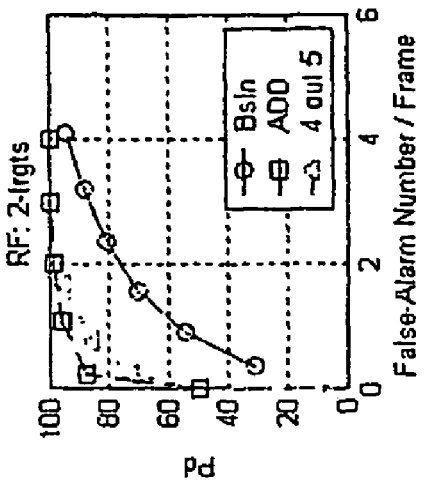
Figure 10D:
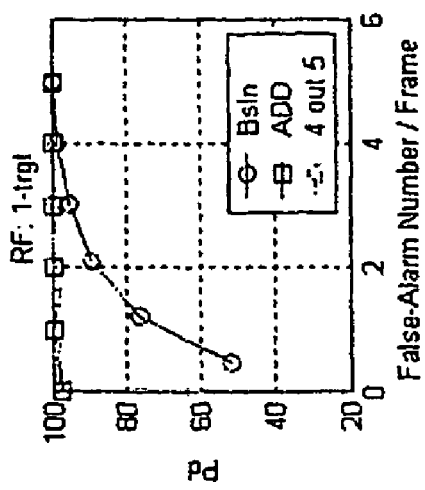
Figure 11A:
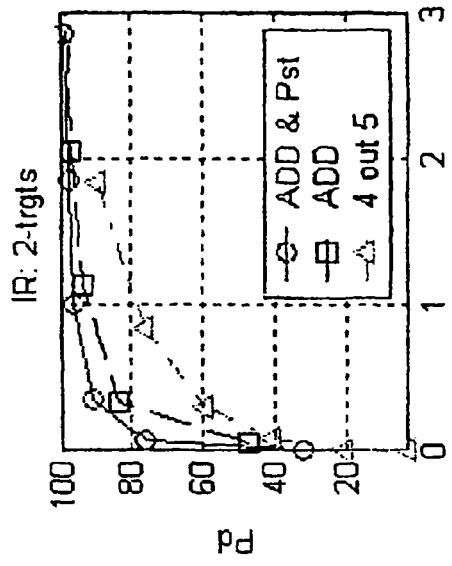
FIGS. 11a-11d are graphs depicting a combination additive fusion and persistency test.
Figure 11B:
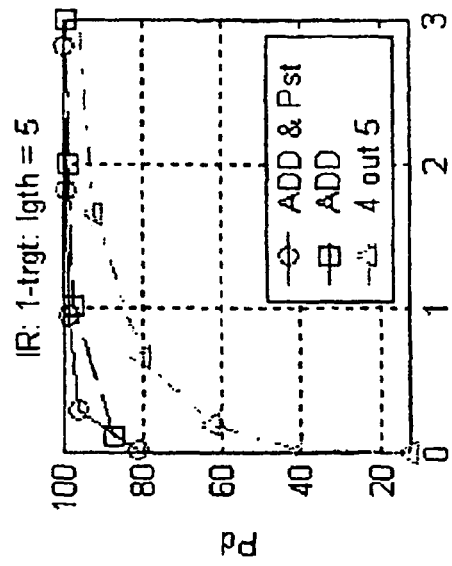
Figure 11C:
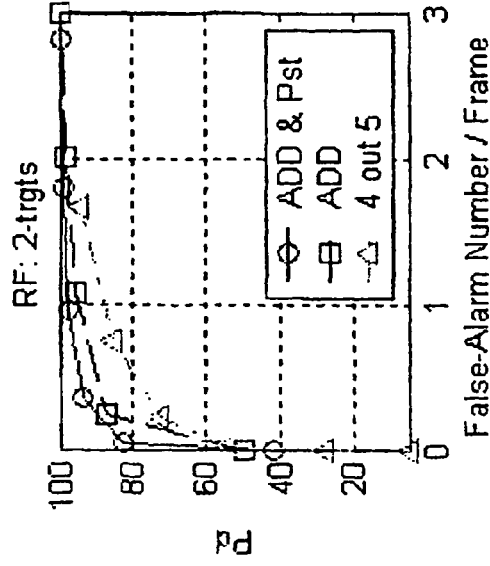
Figure 11D:
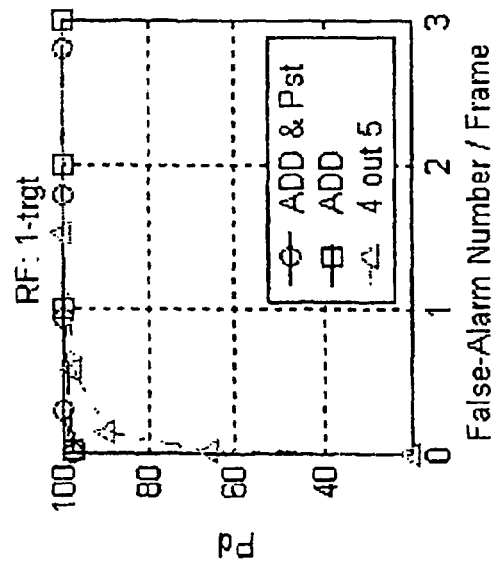

The persistency test has been discussed and shown in Section 4 and FIG. 2. Persistency test results for both IR and RF sensors are shown in FIG. 9. The three curves in each figure are the persistency test for K out of N frames (K=2,3,4; and N=5). Similar to the result in FIG. 2(d), the three curves in FIG. 9 show similar detection enhancements.

Additive Fusion vs. Persistency Test

FIG. 10 shows the results of additive fusion (the curve with square symbols) and the persistency test (the curve with triangle symbols) for both the IR and RF sensors. It is found from FIG. 10 that by integrating only five frames, both additive fusion and persistency test can significantly enhance target detection from the baseline (single frame), with additive fusion performing a little better than the persistency test.

Furthermore, the additive fusion and the persistency test can be complementary to each other. They can be combined to further enhance target detection. Results using an integration window of five frames are shown in FIG. 11. The curves with triangle symbols show the ROC performance of the persistency test, the curves with square symbols show the ROC performance of the additive fusion, and the curves with circle symbols show the combination ROC performance of the additive fusion and persistency test.

As discussed in the previous sections, the performance of temporal integration depends on the temporal correlation properties of the sensor noise. The better performance can be achieved if the noise across the time frames is less correlated. In the simulate results presented in the previous section, we used computer generated random noise that is generally uncorrelated between frames. What about the real sensor noise? To answer this question, we extracted and studied the multiple frame noise from an InSb IR FPA (focal plane array) with 256×256 pixels. Imagery sequences (50 time frames) were collected by this IR sensor looking at different scenes (trees, grass, roads, buildings, etc.).

Studies of the natural IR noise have revealed that 1) the sensor noise at most (>95%) of the sensor pixels are near stationary and un-correlated between pixels as well as (al-most) un-correlated across time frames; and 2) the noise at a few pixels (e.g., the grass aside the road) has shown non-stationary properties (with increasing or decreasing mean across time). FIG. 12(b) shows a typical stationary and uncorrelated noise sequence (50 frames) from a specific pixel. Its auto-correlation function is shown in FIG. 12(a). FIG. 12(d) shows a typical non-stationary noise sequence with a decreasing mean across time. Its auto-correlation function with high temporal correlation is shown in FIG. 12(c). FIG. 12(e) shows the auto-correlation function of a Gaussian random noise sequence (50 frames) generated by a computer (this noise has been used in the simulation discussed in the previous section). It is seen that the natural noise and the computer-generated noise have similar auto-correlation functions [FIGS. 12(a) and (e)], and thus both are highly uncorrelated across time frames.

Figure 13A:
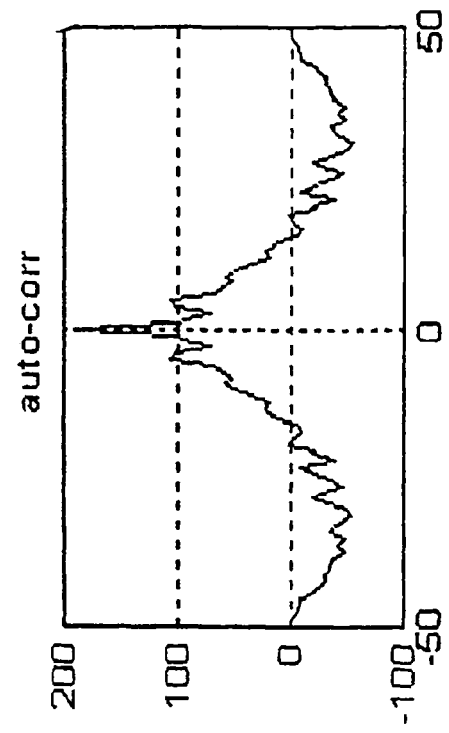
FIGS. 13a-13d are graphs depicting noise de-trend.
Figure 13B:
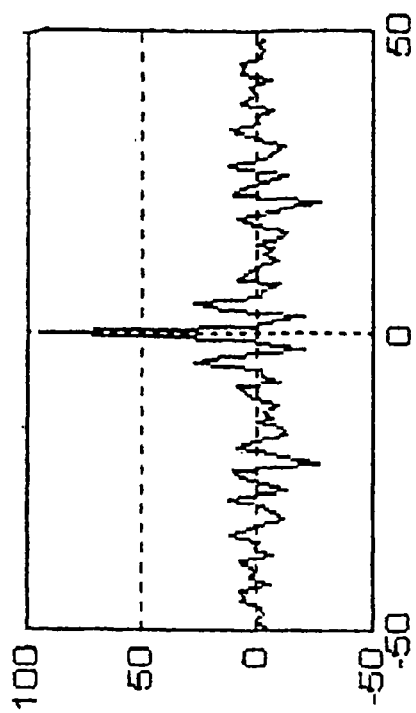
Figure 13C:
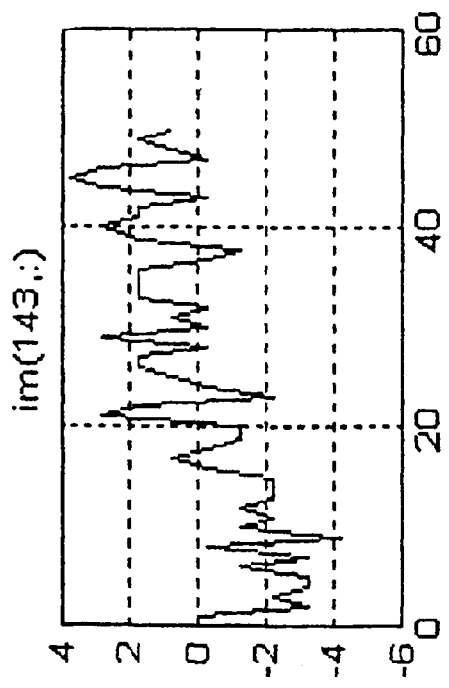
Figure 13D:
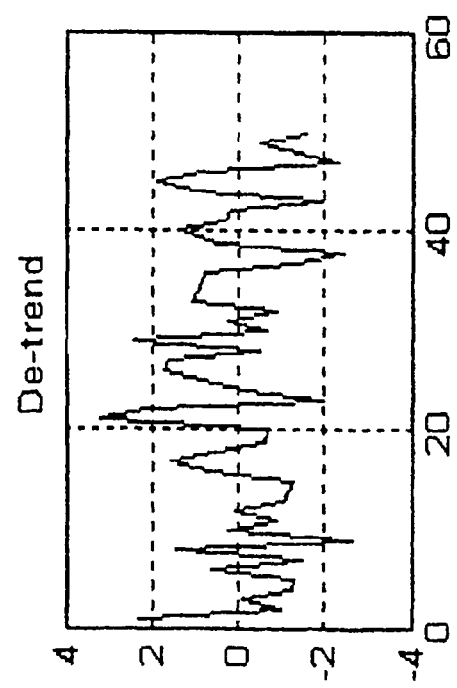

From the natural IR noise, we notice that the non-stationary noise at a specific pixel always shows high values off the center peak in the correlation function. To understand whether the high vales caused by the non-stationary properties only, or caused by both non-stationary and temporal correlation, we have de-trended the non-stationary noise sequences, and remove the increasing or decreasing means. Then we found that the de-trended noise (becoming a stationary process) becomes temporally uncorrelated (low values off the center peak in the correlation function). This finding indicates that the noise at pixels with high off-center correlation values is non-stationary but not temporal correlated. One such example of the noise de-trend is shown in FIG. 13. FIG. 13(a) shows a non-stationary noise sequence with a increasing mean whose auto-correlation function is shown in FIG. 13(b). FIG. 13(c) shows the same noise after de-trend process, and its auto-correlation function is shown in FIG. 13(d). It is seen that the auto-correlation function in FIG. 13(d) has much lower off-center-peak values than that in FIG. 13(b). That is, the detrended noise is temporally uncorrelated.

Figure 14B:
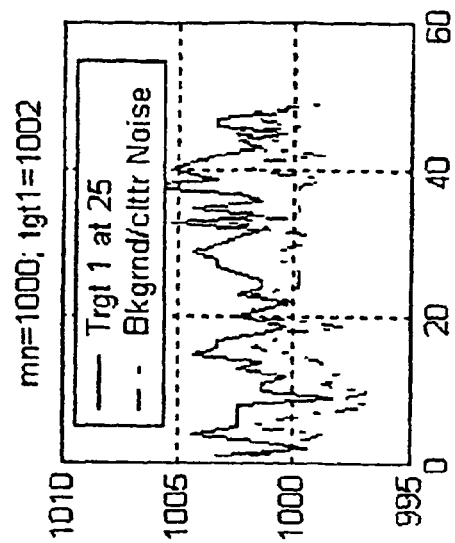
FIGS. 14a-14d are graphs depicting target detection using real IR sensor noise.
Figure 14D:
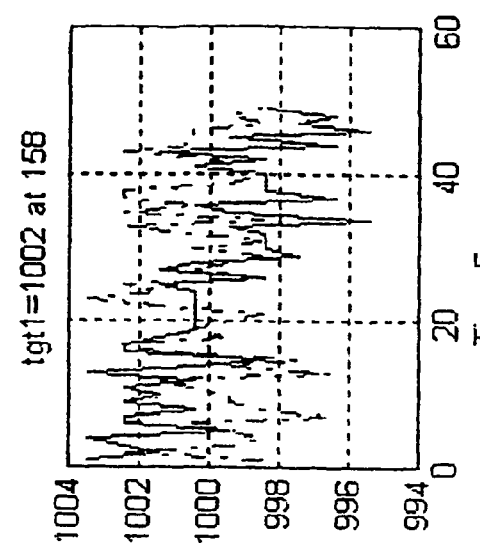
Figure 14A:
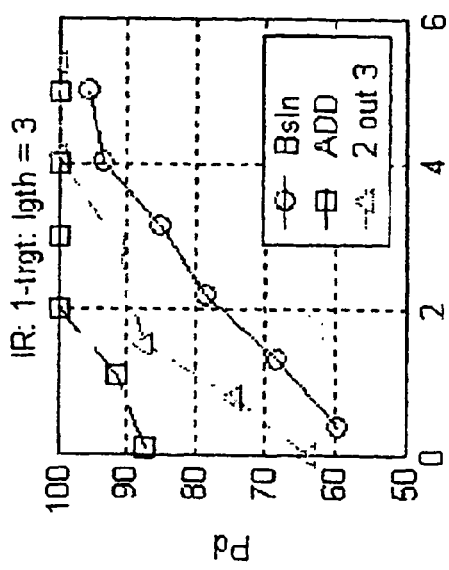
Figure 14C:
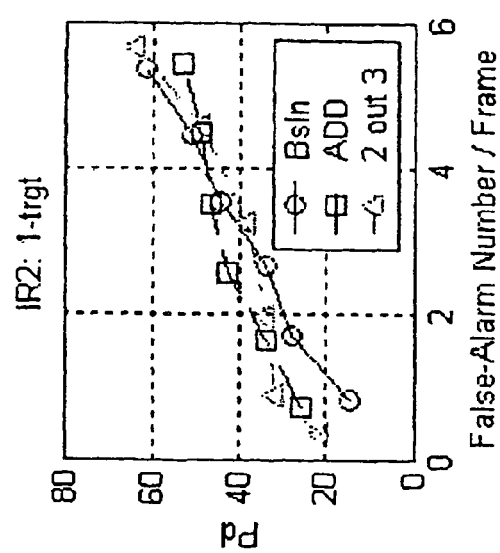

We have applied the IR real noise to test our different temporal fusion strategies, as well as pre- and post-detection temporal integration. The performances using the stationary IR noise are similar to the performances using computer-generated noise as shown in the previous section. FIG. 14(b) shows a stationary target noise sequence (50 frames, the solid curve) and a stationary clutter noise sequence (the dashed curve). The target detection ROC performances are shown in FIG. 14(*a*). The curve with circle symbols shows the baseline (single frame) performance. The curve with triangle symbols shows the performance using persistency test with an integration window of 3 frames (2 out of 3), and the curve with square symbols shows the performance of additive fusion with an integration widow of 3 frames. FIG. 14(*d*) shows a non-stationary target noise sequence (the solid curve) with a decreasing mean and a stationary clutter noise sequence (the dashed curve). The target detection ROC performances are shown in FIG. 14(*c*). It is seen that the detection performances are much worse than the results shown in FIG. 14(*a*).

Figure 15B:
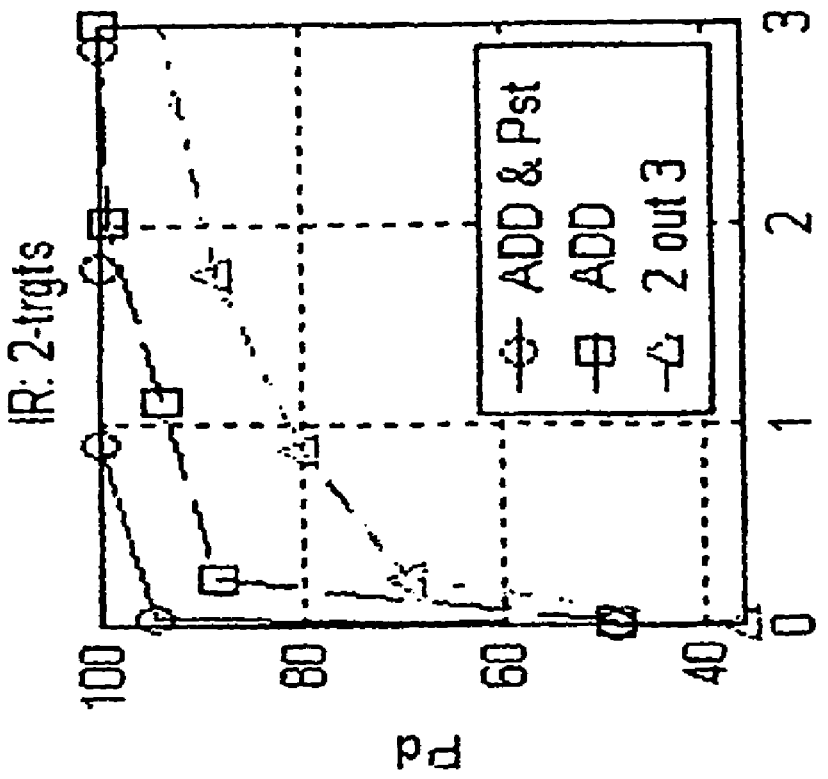
FIGS. 15a and 15b are graphs depicting the combination of pre-detection and post-detection with real IR sensor noise for single target and two target cases.
Figure 15A:
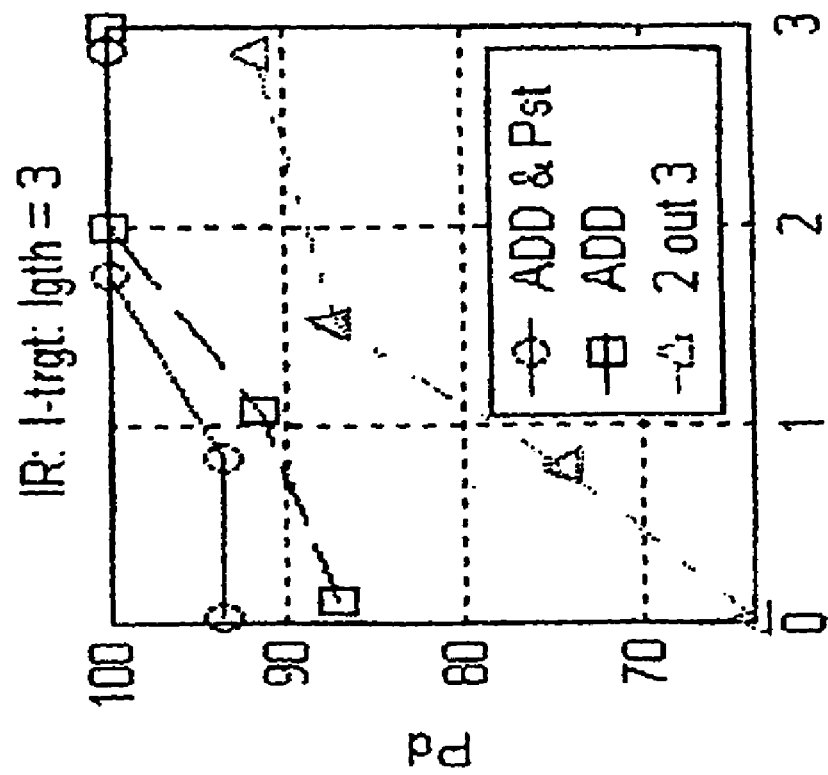

The results of combining predetection and postdetection integration with real IR noise for single and two target cases are shown in FIGS. 15(*a*) and 15(*b*), respectively. The curves with triangles show the ROC performance of the persistency tests with an integration window of three frames, the curves with squares show the ROC performance of the additive fusion, and the curves with circles show the combined ROC performance of the additive fusion and the persistency test. It can be seen that use of this combination can further improve target detection performance.

Temporal Fusion and IR Sensor Non-Uniformity Correction

In the traditional NUC (non-uniformity correction) design, frame subtraction is generally used to subtract out the FPN (fixed pattern noise). However, direct subtraction of two adjacent frames will double the variance of the temporal noise. To avoid a large increase of temporal noise, the NUC design is applied a feedback loop and only a small fraction of the FPN is subtracted out at each iteration. Nevertheless, if we apply temporal integration in the detection system after the NUC process, we can afford the direct subtraction between two nearby frames, and further reduce the noise. For example, the sum of n original frames results in a variance of n×v (where v is the single frame variance). On the other hand, the sum of n subtracted frames results in a variance of 2×v, because all the variances in the middle frames are cancelled out and only the two variances in the first and the last frames are leftover. Therefore, for an average of n original frames, the resulting variance is v/n, while averaging n subtracted frames, the resulting variance is $2v/n^2$. That is, $(2v/n^2)<(v/n)$ when $n>2$.

Double-Thresholding Detection Scheme

Figure 16:
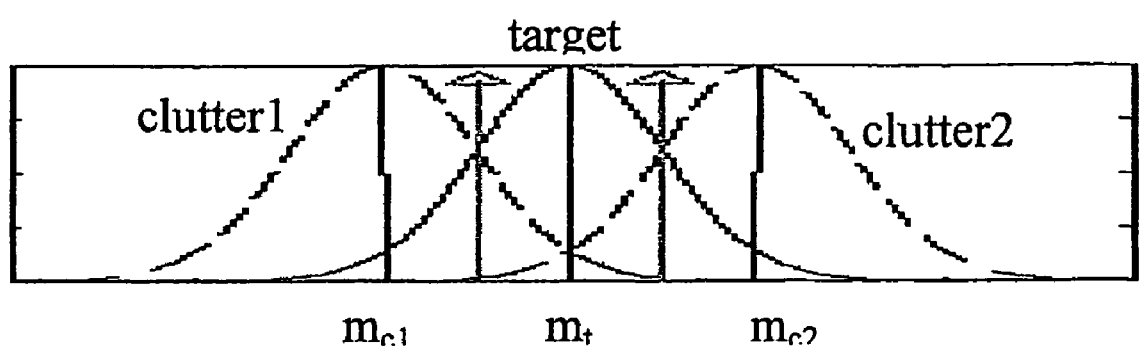
FIG. 16 is a graph depicting Gaussian pdfs of clutters and targets.

If the feature values of all different clutters in a scene are lager (or smaller) than the target feature value as indicated in FIG. 4, the traditional CFAR detection scheme will still works. For the example in FIG. 4, the CFAR scheme always treats an object with a feature value below the threshold as a clutter, and above the threshold as a target. However, in reality, the clutter situations are very complicated. As shown in FIG. 16, some clutter groups (e.g., some trees or roads) may have feature values lower that the target, while some other clutter groups (e.g., some decoy-like objects, or counter-measurement objects) may look more like the target and thus have feature values higher than the target. In these situations, the traditional CFAR scheme will partly fail because it only uses a single-thresholding scheme that can only threshold out one of the clutter groups. This increases the likelihood that other groups will be incorrectly be detected as targets.

In the situation that some clutter feature values are larger than and some are smaller than the target feature value, we propose a double-thresholding scheme with one up-bound threshold and one lower-bound threshold. The technique in combination with the temporal integration will considerably enhance target detection. For example, as shown in FIG. 15, suppose the two clutters and the target have Gaussian distributions with the same variances. The separation of the target from the two clutters is two a (i.e., two standard deviation):

$$m_t - m_{c1} = m_{c2} - m_t = 2\sigma$$

If we set the double thresholds as one σbelow and one σabove the target mean $m_t$, the detection criteria is that only a object with a feature value larger than the lower bound threshold and smaller than the higher bound threshold is assigned as a detection. This is a two-sigma probability and for a Gaussian distribution the Pd (Probability of target detection) is around 68%, and the Pfa (probability of false-alarm) caused by the two clutter groups is around 34% (=17% +17%). This is the baseline performance for the traditional single frame detection. However, if we apply the temporal integration of 9 frames with the additive fusion (equivalent to averaging 9 frames), the standard deviations for the clutters and the target will be reduced by a factor of 3. It should be presumed that the noise in the frames is temporally un-correlated. Then this is a six-sigma probability. The Pd is increased to above 99%, and the Pfa caused by the two clutters is reduced to below 2%.

In this technique, for appropriately selecting the two thresholds, we prefer to have the pre-knowledge of the target mean that may be available from some good training data Reverse-Thresholding Detection Scheme Another situation that the traditional CFAR scheme will fail is when non-stationary targets and/or clutters exist. As shown in FIG. 14(*d*) where a non-stationary target with a decreasing mean exists. At an earlier time moment, the target mean is larger than the clutter mean, while at a later time moment the target mean is below the clutter mean. For a traditional CFAR single-thresholding approach, we set a single threshold, and any object with a feature value above it will be assigned as a detected target. (It should be noted that for the traditional CFAR scheme, the threshold itself is changing (floating) from frame to frame to keep a constant false-alarm rate.) This approach works at earlier time moments when the target mean is larger than the clutter mean. However, it will fail when the target mean moves close to and further below the clutter mean, the clutter will have much higher probability to be falsely detected as a target than the real target. That is why the detection performances in FIG. 14(*c*) are lesser than those in FIG. 14(*a*).

Similarly, a non-stationary clutter situation can be easily understood using FIG. 15. Suppose at an earlier moment the non-stationary clutter with a increasing mean was at the clutter1 location. At a later time moment, it moved from the left side of the target to the right side of the target at the clutter2 location. Based on these observations, we propose a reverse-thresholding scheme to deal with the non-stationary case. As shown in FIG. 15, when the non-stationary clutter mean is blow the target mean, we set the criteria for assigning a detection as the object's feature value is above the threshold, while when the clutter mean changed to above the target mean, we set the criteria for assigning a detection as the object's feature value is below the threshold. This technique needs the real time measurements of the changing mean of a non-stationary process. This task may be conducted by using a temporal moving widow or the Wiener and/or Kalman filtering techniques.

Figure 18:
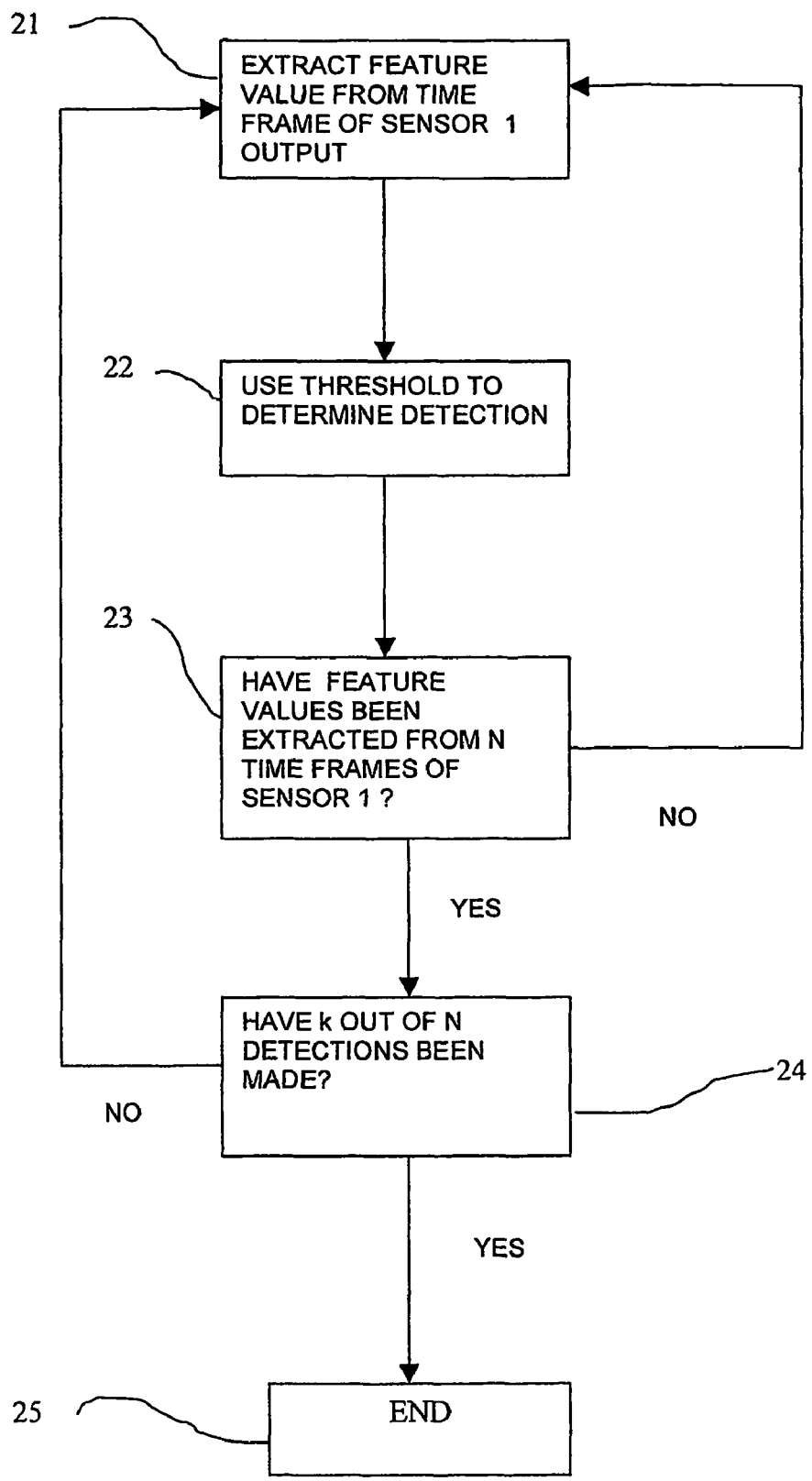
FIG. 18 is a flow chart for implementing temporal fusion utilizing pre-detection integration.

Referring now to FIG. 18, a flow chart illustrates how temporal fusion utilizing post-detection integration or a persistency test can be implemented. In FIG. 18, the first step 21 is to extract a feature value from the first time frame of a sensor. A threshold technique is implemented in step 22 in order to make a detection from the data output during the time frame. In step 23 it is determined whether a predetermined number of time frames have been processed. If N time frames have been processed, then a determination is made in step 24 whether a certain number of detections have been made. If the number of detections have been made, then there is a positive indication of detection and the process is ended in step 25.

Figure 19:
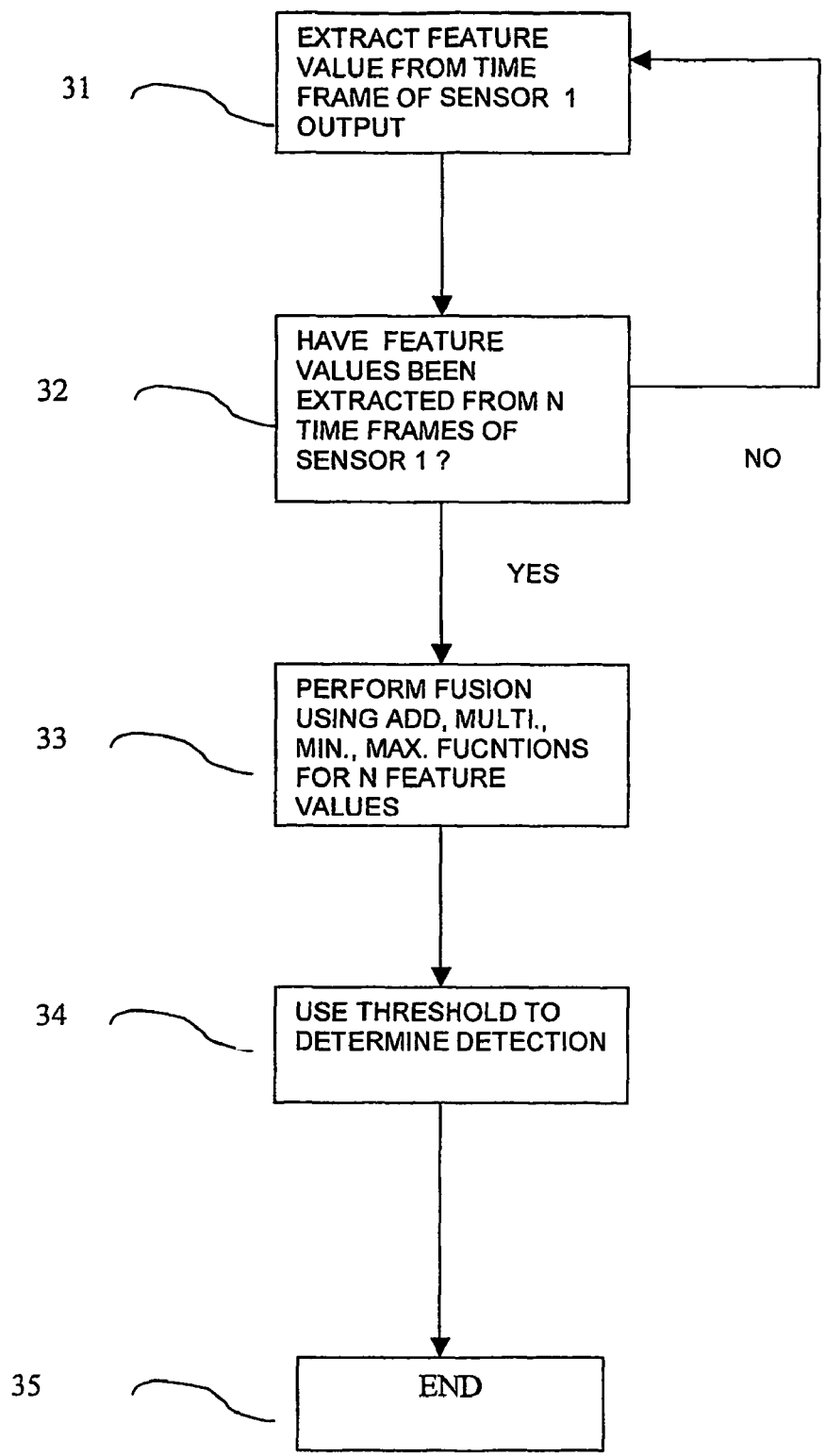
FIG. 19 is a flow chart for implementing temporal fusion utilizing post-detection integration.

Referring now to FIG. 19, a flow chart illustrates how temporal fusion utilizing pre-detection integration can be implemented. In FIG. 19, the first step 31 is to extract a feature value from the first time frame of a sensor. In step 32 it is determined whether a predetermined number of time frames have been processed. If N time frames have been processed, then feature values from the predetermined number of time frames are fused using one or more of the fusion functions described above. A threshold technique is implemented in step 34 in order to make a detection from the data output during the predetermined number of time frames N. If the thresholding technique results in a positive indication of detection, the process is ended in step 35.

Figure 20:
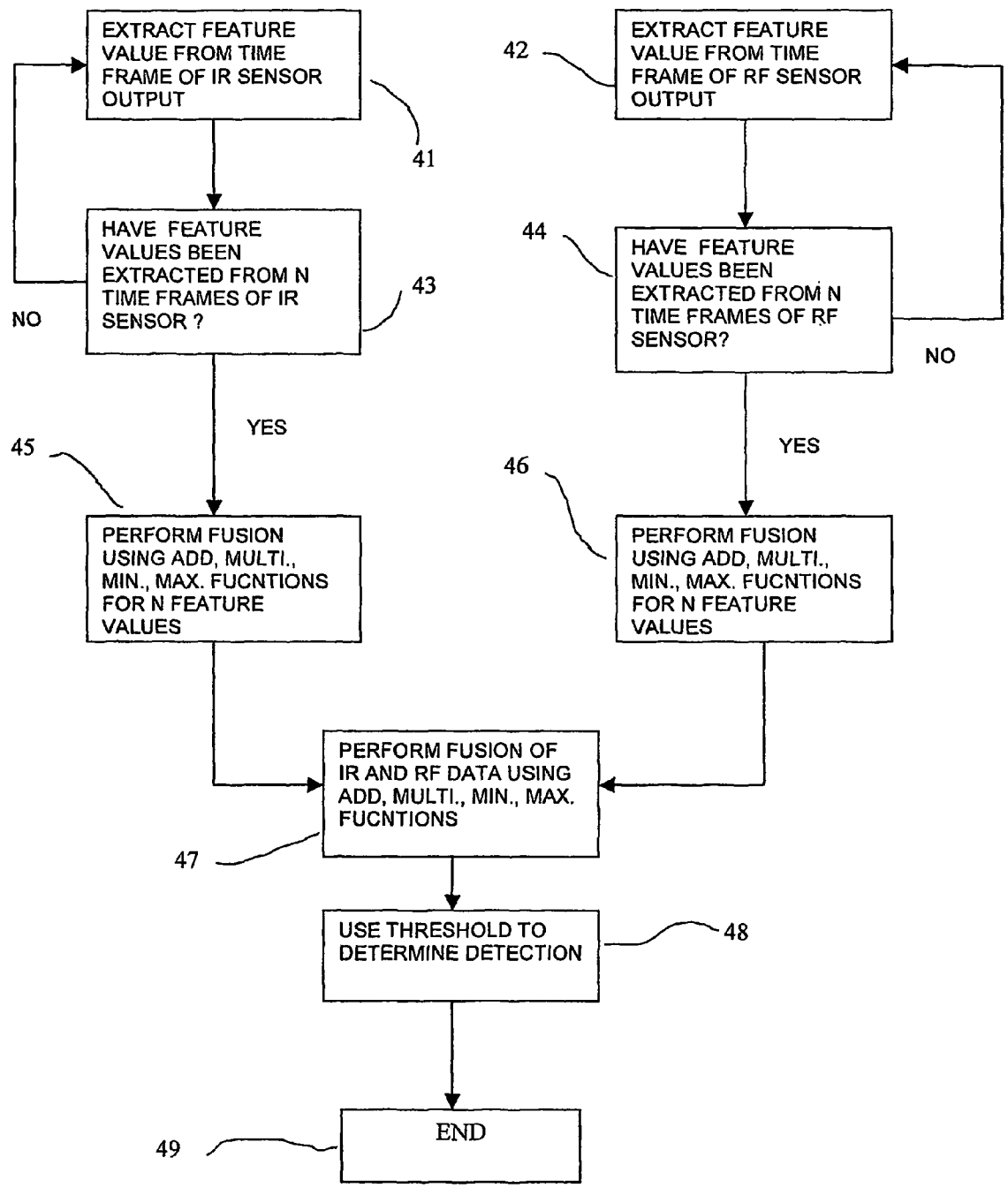
FIG. 20 is a flow chart for implementing temporal integration and spatial fusion from an IR sensor and an RF sensor.

Referring now to FIG. 20, a flow chart illustrates how spatio temporal fusion utilizing data output from a plurality of sensors can be implemented. In FIG. 20, the plurality of sensors includes an IR sensor and a RF sensor. The first steps 41, 42 include extracting a feature value from the first time frame of each sensor. In steps 43, 44 it is determined whether a predetermined number of time frames have been processed from each sensor. If N time frames have been processed, then in steps 45, 46 feature values from the predetermined number of time frames are temporally fused using one or more of the fusion functions described above. In step 47, the temporally fused data is spatially fused utilizing a fusion function. A threshold technique is implemented in step 48 in order to make a detection from the data generated during the spatial fusion 47. If the thresholding technique results in a positive indication of detection, the process is ended in step 49.

The sensor and data fusion techniques described above are effective ways to improve target detection and recognition. Current research in this field concentrates mainly in the direction of spatial fusion (fusion from different sensors). The temporal fusion (i.e., fusion across multiple time frames within a specific sensor) of the present invention can also considerably improve target detection and recognition.

A parameter for temporal fusion is the fusion window size of multiple time frames. In general, the larger the window size the better the fused results that are achieved. However, under some nonstationary situation or in the presence of large tracking errors (or both), a large window will cause large uncorrelated errors. Both the predetection and postdetection temporal integrations of the present invention considerably improve target detection by preferably integrating only ~3-5 time frames (tested by real sensor noise as well as computer-generated noise). These disclosed predetection temporal integration techniques (additive, multiplicative, or MIN fusion) perform better than the traditional postdetection temporal integration technique (persistency test). Detection results can be further improved by combining both the predetection and postdetection temporal integrations.

Although most examples disclosed herein are for target detection, the techniques can also be used for target recognition (such as the ATR approach with matched filtering and correlation techniques), provided multiple time frames are available. It should be noted that fusion is conducted in the feature domain by fusing tracked object features across different time frames, but it is not conducted in the original image domain. For example, if the extracted feature is the peak-to-sidelobe ratio of ATR correlation, the ATR with fused features across multiple time frames will perform better than the ATR with a feature from only a single frame.

Two advanced thresholding techniques, double thresholding and reverse thresholding, have been disclosed. They should perform well in some complicated clutter situation in which the traditional CFAR single-thresholding technique may fail. A simple example of the double-thresholding technique in a complicated clutter situation with a mix of two clutter types has been disclosed. The double-thresholding technique, in combination with temporal fusion of multiple time frames, can improve the Pd from 68% to 99%. In the actual application of the double-thresholding technique, there should be some prior knowledge of the target mean and distribution to set the upper- and lower-bound thresholds. In general, this information can be obtained from reliable training data. It should be noted, however, that the clutter types may number more than 2 and the noise across the time frames may not be totally temporally uncorrelated.

The training data suggests that, if clutter groups are encountered with a pdf that is broader than that for the target, then a determination should be made whether the broad clutter pdf is caused by nonstationary noise with a time-variant mean or by a mix of different clutter types with different stationary means. Once this is known, different detection techniques can be selected, such as the disclosed double-thresholding or reverse thresholding schemes.

The present specification describes a number of different techniques including temporal fusion, spatial fusing and thresholding and these techniques can be implemented empirically in various ways and combinations using the principles set forth herein.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

We claim:

1. A method to identify a potential target from image data representing a scene, comprising:
   receiving at least two frames of image data from at least one imaging sensor;
   performing at least one of a pre-detection temporal fusion and a pre-detection spatial fusion of the frames of image data;
   thresholding the fused image data after performing the step of performing; and
   identifying candidate targets from the thresholded image data, wherein
      the pre-detection temporal fusion comprises temporally integrating image data from a said imaging sensor across a plurality of time frames and the at least two frames of image data are from the sensor; and
      the pre-detection spatial fusion comprises fusing the image data from a plurality of said imaging sensors across a single time frame and the at least two frames of image data include at least one frame of image data from two different sensors.

2. The method of claim 1, wherein the pre-detection temporal fusion and the pre-detection spatial fusion includes at least one of an additive fusion, multiplicative fusion, minimum fusion, and maximum fusion.

3. The method of claim 1, wherein the thresholding includes at least one of:
a double-thresholding wherein an upper and a lower bound thresholds are set to identify the potential target; and
a reverse-thresholding wherein a potential target identification level is set to be below a particular threshold.

4. A method to identify a potential target from image data of a scene, comprising:
receiving at least two frames of image data from at least one imaging sensor;
thresholding the frames of image data, wherein said frames of image data are frames of image data from across multiple time frames of said at least one sensor or frames of image data from a plurality of said sensors;
fusing the frames of image data after thresholding, by spatial fusion if the frames of image data are frames of image data from said plurality of sensors or by temporal fusion if the frames of image data are frames of image data from across multiple time frames of said at least one sensor; and
identifying candidate targets from the fused image data.

5. The method of claim 4, wherein thresholding includes at least one of:
double-thresholding the image data, where an upper and a lower bound threshold are set to identify the potential target; and
reverse-thresholding wherein a potential target identification level is set to be below a particular threshold.

6. A device to identify potential targets from at least two frames of image data generated by at least one imaging sensor and representative of a scene, comprising:
a fusion module configured to perform at least one of a temporal fusion and a spatial fusion of the generated frames of image data; and
a threshold module configured to apply thresholding techniques on the fused image data, wherein
the temporal fusion includes temporally fusing the frames of image data across a plurality of time frames and the at least two frames of image data are from the same sensor; and
the spatial fusion includes fusing the frames of image data across a single time frame and the at least two frames of image data are from different sensors.

7. The device of claim 6 wherein said device further includes at least one imaging sensor.

8. The device of claim 6, wherein fusion module is configured to perform at least one of an additive fusion, multiplicative fusion, minimum fusion, and maximum fusion.

9. The device of claim 6, wherein the fusion module is configured to perform at least one of a pre-detection fusion and a persistence test.

10. The device of claim 6, wherein the threshold module is configured to perform at least one of a double-thresholding technique and a reverse-thresholding technique.

11. A method to identify a potential target from data, comprising the steps of:
receiving as input data, a plurality of time frames of data from at least one sensor;
extracting, from said time frames of data, at least one feature;
performing a pre-detection technique on the least one extracted feature, where said pre-detection technique includes either a double threshold technique or a reverse threshold technique; and
determining whether said extracted feature is a potential target.

12. A method according to claim 11 wherein said determining includes performing a post-detection technique to determine whether a certain criteria has been met.

13. A method according to claim 11 wherein said pre-detection technique includes said double threshold technique, and further wherein said double-threshold technique includes setting a detection criteria having a lower bound threshold value and an upper bound threshold for determining whether an object corresponding to the extracted feature has a feature value between the lower bound threshold value and upper bound threshold value.

14. A method according to claim 11 wherein said pre-detection technique includes said reverse threshold technique, and further wherein said reverse threshold technique includes setting a detection criteria for a non-stationary object such that a mean value of an extracted feature is compared to a target mean value, and the extracted feature is determined to be a non-stationary object when its mean value is greater or lesser than the target mean value.

15. A method to identify a potential target from data, comprising the steps of:
receiving, as input, data from a plurality of sensors;
performing a pre-detection fusion technique on data corresponding to at least one extracted feature from each sensor;
wherein said pre-detection fusion technique includes at least one technique that is selected from a group comprised of additive fusion, multiplicative fusion, minimum fusion and maximum fusion; and
determining whether the pre-detection fused data is a potential target.

16. A method according to claim 15 which further includes the step of:
performing a post-detection technique when there is data from at least three sensors, said post-detection technique selected from a group consisting of a double threshold technique and a reverse threshold technique.

17. A method according to claim 16 wherein said double threshold includes setting a detection criteria having a lower bound threshold value and an upper bound threshold for determining whether an object corresponding to the extracted feature has a feature value between the lower bound threshold value and upper bound threshold value.

18. A method according to claim 16 wherein said reverse threshold technique includes setting a detection criteria for a non-stationary object such that a mean value of an extracted feature is compared to a target mean value, and the extracted feature is determined to be a non-stationary object when its mean value is greater or lesser than the target mean value.

19. A target detection apparatus, comprising:
a plurality of sensors for outputting data related to a target, said data from each sensor having a plurality of time frames;
temporal processing means for integrating the data supplied from each of said plurality of sensors;
spatial processing means for fusing the temporally integrated sensor data from said temporal processing means, wherein said spatial processing means detects the target from the spatially fused data and provides an indication corresponding to the detected target; and
means for utilizing the indication of the detected target.

20. The target detection apparatus of claim 19, the apparatus further comprising:
a threshold module that performs a pre-detection technique on at least one extracted feature, where said feature is extracted from said plurality of time frames of data of a given sensor; and wherein said pre-detection technique includes either a double threshold technique or a reverse threshold technique.

* * * * *